US012634014B2

(12) United States Patent
Kozato

(10) Patent No.: US 12,634,014 B2
(45) Date of Patent: May 19, 2026

(54) OPTICAL TRANSCEIVER, OPTICAL COMMUNICATION SYSTEM, OPTICAL TRANSMISSION APPARATUS, METHOD FOR SETTING OPTICAL TRANSCEIVER, AND COMPUTER-READABLE MEDIUM

(71) Applicant: NEC Corporation, Tokyo (JP)

(72) Inventor: Atsushi Kozato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 335 days.

(21) Appl. No.: 18/574,133

(22) PCT Filed: Jun. 30, 2021

(86) PCT No.: PCT/JP2021/024742

§ 371 (c)(1),
(2) Date: Dec. 26, 2023

(87) PCT Pub. No.: WO2023/276042

PCT Pub. Date: Jan. 5, 2023

(65) Prior Publication Data

US 2024/0333396 A1 Oct. 3, 2024

(51) Int. Cl.
H04B 10/00 (2013.01)
H04B 10/40 (2013.01)
(Continued)

(52) U.S. Cl.
CPC ........... H04B 10/572 (2013.01); H04B 10/40 (2013.01); H04J 14/021 (2013.01)

(58) Field of Classification Search
CPC .............. H04J 14/0227; H04J 14/0241; H04J 14/0256; H04J 14/0257; H04B 10/40; H04B 10/572
See application file for complete search history.

(56) References Cited

U.S. PATENT DOCUMENTS

2007/0077072 A1* 4/2007 Kunimatsu ......... H04J 14/0227
398/135

FOREIGN PATENT DOCUMENTS

JP 2003-258373 A 9/2003
JP 2005-229298 A 8/2005
(Continued)

OTHER PUBLICATIONS

International Search Report for PCT Application No. PCT/JP2021/024742, mailed on Sep. 14, 2021.

*Primary Examiner* — Daniel G Dobson
(74) *Attorney, Agent, or Firm* — Sughrue Mion, PLLC

(57) ABSTRACT

A wavelength-tunable optical transmission unit repeatedly transmits a first channel setting optical signal while changing a transmission channel until a wavelength-tunable optical reception unit receives a second channel setting optical signal in response to a first instruction signal. When the wavelength-tunable optical reception unit receives the second channel setting optical signal, a channel indicated by second channel information is set as a channel of an optical signal to be received by the wavelength-tunable optical reception unit. When a second instruction signal is received after the first instruction signal is received, a channel of an optical signal to be transmitted by the wavelength-tunable optical transmission unit is set to a first designated channel, and a channel of an optical signal to be received by the wavelength-tunable optical reception unit is set to a second designated channel.

8 Claims, 15 Drawing Sheets

(51) Int. Cl.
  *H04B 10/572*   (2013.01)
  *H04J 14/02*    (2006.01)
  *H04J 14/00*    (2006.01)

(56)       References Cited

FOREIGN PATENT DOCUMENTS

| | | | |
|---|---|---|---|
| JP | 2005-229299 | A | 8/2005 |
| JP | 2010041444 | A  * | 2/2010 |
| JP | 2011-004270 | A | 1/2011 |
| JP | 2016-025127 | A | 2/2016 |
| JP | 2017-539142 | A | 12/2017 |
| JP | 2020-080465 | A | 5/2020 |
| JP | 2020-080466 | A | 5/2020 |
| WO | 2018/010779 | A1 | 1/2018 |

\* cited by examiner

Fig. 2

OPTICAL TRANSCEIVER, OPTICAL COMMUNICATION SYSTEM, OPTICAL TRANSMISSION APPARATUS, METHOD FOR SETTING OPTICAL TRANSCEIVER, AND COMPUTER-READABLE MEDIUM

This application is a National Stage Entry of PCT/JP2021/024742 filed on Jun. 30, 2021, the contents of all of which are incorporated herein by reference, in their entirety.

TECHNICAL FIELD

The present invention relates to an optical transceiver, an optical communication system, an optical transmission apparatus, a method for setting an optical transceiver, and a computer-readable medium.

BACKGROUND ART

Optical communication systems that enable optical communication by connecting base stations on land to each other via optical cables have been widely used. Each of the base stations is provided with an optical transmission apparatus on which one or more optical transceivers are installed. In starting use of the optical transceiver, initial setting of the optical transceiver is performed.

There is disclosed a technology in which communication is started between optical transceivers after adjustment of a transmission speed, a data format, and a transmission format prior to data communication (Patent Literature 1). In this technology, a test signal in which a transmission speed and a transmission format between the optical transceivers are set is transmitted and received between the optical transceivers. The transmission speed is set by comparing a transmission speed used to transmit the test signal with a transmission speed of the received test signal. The transmission format is set to correspond to a transmission path state estimated according to erroneous detection of the test signal. The data format is determined by transmitting and receiving information regarding a data format after the transmission speed and the transmission format are determined. After these are determined, communication between the optical transceivers is started.

Further, there is proposed a technique of starting bidirectional communication of a data packet between optical transceivers in a non-communication state (Patent Literature 2). In this technique, prior to the bidirectional communication of a data packet, a connection packet having specific information of each of the optical transceivers and having a low speed equal to or lower than a transmission speed of the data packet is transmitted and received between the optical transceivers via an optical fiber transmission path. Then, one of the optical transceivers is set as a master and the other is set as a slave according to the specific information of the connection packet received by each of the optical transceivers, and the optical transceiver serving as the slave is notified of a transmission method set by the optical transceiver serving as the master via a configuration packet. The bidirectional communication between the optical transceivers is performed by the set transmission method through this notification.

Furthermore, there is proposed a technique of performing negotiation of wavelengths to be used for communication between optical modules in a passive optical network (PON) system including an optical line terminal (OLT) and an optical network unit (ONU) (Patent Literature 3). In this technique, an optical module (referred to as a first optical module) periodically transmits a wavelength idle signal of a selected first wavelength to an optical module as a counterpart (referred to as a second optical module). The wavelength idle signal indicates that the selected first wavelength is available, and the second optical module having received the wavelength idle signal transmits, to the first optical module, a wavelength request message of a second wavelength corresponding to the first wavelength. When receiving the wavelength request message, the first optical module transmits a wavelength grant message to the second optical module to grant use of the selected wavelength. As a result, wavelengths to be used for transmission and reception of optical signals between the two optical modules are determined.

CITATION LIST

Patent Literature

Patent Literature 1: Japanese Unexamined Patent Application Publication No. 2005-229298
Patent Literature 2: Japanese Unexamined Patent Application Publication No. 2005-229299
Patent Literature 3: Published Japanese Translation of PCT International Publication for Patent Application, No. 2017-539142

SUMMARY OF INVENTION

Technical Problem

In general, a plurality of optical transceivers are mounted on an optical transmission apparatus, and it is necessary to perform initial setting for setting channels (wavelengths) to be used for transmission and reception by each of the optical transceivers. In this case, if channel setting of a large number of optical transceivers mounted on the optical transmission apparatus is manually performed, a large amount of time is required for the setting work. Therefore, from the viewpoint of shortening a work time, it is desirable that a channel of an optical signal transmitted and received by an optical transceiver can be autonomously set as initial setting when the optical transceiver is mounted on the optical transmission apparatus.

In the technique of Patent Literature 3, channels (wavelengths) to be used for transmission and reception can be set by performing the wavelength negotiation between the two optical modules (optical transceivers), but the ability of performing transmission and reception of an optical signal of a specific channel between the two optical modules is assumed in the first place. In other words, the first and second wavelengths to be used need to be assigned manually. That is, the technique of Patent Literature 3 merely confirms that a path for transmission and reception can be used using the assigned channel, and a channel to be used cannot be autonomously set.

The present invention has been made in view of the above circumstances, and an object thereof is to autonomously set a channel of an optical signal transmitted and received between optical transceivers.

Solution to Problem

An optical transceiver according to one aspect of the present invention includes: a wavelength-tunable optical transmission unit configured to be capable of transmitting a first channel setting optical signal superimposed on a first main signal obtained by modulating data to be transmitted, the first channel setting optical signal including first channel information indicating a channel of the first channel setting optical signal; a wavelength-tunable optical reception unit configured to forward second channel information included in a second channel setting optical signal when the second channel setting optical signal superimposed on a second main signal obtained by modulating data to be received is received from another optical transceiver, the second channel information indicating a channel of the second channel setting optical signal; and a control unit configured to control the wavelength-tunable optical transmission unit and the wavelength-tunable optical reception unit. The control unit causes the wavelength-tunable optical transmission unit to repeatedly transmit the first channel setting optical signal while changing a transmission channel of the first channel setting optical signal until the wavelength-tunable optical reception unit receives the second channel setting optical signal when the first instruction signal is received; sets a channel indicated by the second channel information as a channel of an optical signal to be received by the wavelength-tunable optical reception unit when the wavelength-tunable optical reception unit receives the second channel setting optical signal; and sets a channel of an optical signal to be transmitted by the wavelength-tunable optical transmission unit to a first designated channel and sets a channel of an optical signal to be received by the wavelength-tunable optical reception unit to a second designated channel when a second instruction signal designating the first designated channel of the optical signal to be transmitted by the wavelength-tunable optical transmission unit and the second designated channel of the optical signal to be received by the wavelength-tunable optical reception unit are received after a first instruction signal is received.

An optical communication system according to one aspect of the present invention includes: two optical transmission apparatuses facing each other, each of the optical transmission apparatuses including a plurality of optical transceivers and a first optical multiplexer/demultiplexer configured to multiplex optical signals output from the plurality of optical transceivers and output a multiplexed optical signal and demultiplexes a received optical signal into the plurality of optical transceivers according to a channel; and an optical cable configured to connect the two optical transmission apparatuses facing each other. A first optical transceiver that is the optical transceiver of one of the optical transmission apparatuses includes: a wavelength-tunable optical transmission unit configured to be capable of transmitting a first channel setting optical signal superimposed on a first main signal obtained by modulating data to be transmitted, the first channel setting optical signal including first channel information indicating a channel of the first channel setting optical signal; a wavelength-tunable optical reception unit configured to forward second channel information included in a second channel setting optical signal when the second channel setting optical signal superimposed on a second main signal obtained by modulating data to be received is received from a second optical transceiver that is the optical transceiver of another of the optical transmission apparatuses, the second channel information indicating a channel of the second channel setting optical signal; and a control unit configured to control the wavelength-tunable optical transmission unit and the wavelength-tunable optical reception unit. The control unit causes the wavelength-tunable optical transmission unit to repeatedly transmit the first channel setting optical signal while changing a transmission channel of the first channel setting optical signal until the wavelength-tunable optical reception unit receives the second channel setting optical signal when the first instruction signal is received; sets a channel indicated by the second channel information as a channel of an optical signal to be received by the wavelength-tunable optical reception unit when the wavelength-tunable optical reception unit receives the second channel setting optical signal; and sets a channel of an optical signal to be transmitted by the wavelength-tunable optical transmission unit to a first designated channel and sets a channel of an optical signal to be received by the wavelength-tunable optical reception unit to a second designated channel when a second instruction signal designating the first designated channel of the optical signal to be transmitted by the wavelength-tunable optical transmission unit and the second designated channel of the optical signal to be received by the wavelength-tunable optical reception unit are received after a first instruction signal is received.

An optical transmission apparatus according to one aspect of the present invention includes: a plurality of optical transceivers; and a first optical multiplexer/demultiplexer configured to multiplex optical signals output from the plurality of optical transceivers and output a multiplexed optical signal and demultiplexes a received optical signal into the plurality of optical transceivers according to a channel. Each of the optical transceiver includes: a wavelength-tunable optical transmission unit configured to be capable of transmitting a first channel setting optical signal superimposed on a first main signal obtained by modulating data to be transmitted, the first channel setting optical signal including first channel information indicating a channel of the first channel setting optical signal; a wavelength-tunable optical reception unit configured to forward second channel information included in a second channel setting optical signal when the second channel setting optical signal superimposed on a second main signal obtained by modulating data to be received is received from an optical transceiver of another optical transmission apparatus connected via an optical cable, the second channel information indicating a channel of the second channel setting optical signal; and a control unit configured to control the wavelength-tunable optical transmission unit and the wavelength-tunable optical reception unit. The control unit causes the wavelength-tunable optical transmission unit to repeatedly transmit the first channel setting optical signal while changing a transmission channel of the first channel setting optical signal until the wavelength-tunable optical reception unit receives the second channel setting optical signal when a first instruction signal is received; sets a channel indicated by the second channel information as a channel of an optical signal to be received by the wavelength-tunable optical reception unit when the wavelength-tunable optical reception unit receives the second channel setting optical signal; and sets a channel of an optical signal to be transmitted by the wavelength-tunable optical transmission unit to a first designated channel and sets a channel of an optical signal to be received by the wavelength-tunable optical reception unit to a second designated channel when a second instruction signal designating the first designated channel of the optical signal to be transmitted by the wavelength-tunable optical transmission unit and the second designated channel of the optical signal to be received by the wavelength-tunable optical reception unit are received after the first instruction signal is received.

A method for setting an optical transceiver according to one aspect of the present invention, the method includes: in the optical transceiver including: a wavelength-tunable optical transmission unit configured to be capable of transmitting a first channel setting optical signal superimposed on a first main signal obtained by modulating data to be transmitted, the first channel setting optical signal including first channel information indicating a channel of the first channel setting optical signal; a wavelength-tunable optical reception unit configured to forward second channel information included in a second channel setting optical signal when the second channel setting optical signal superimposed on a second main signal obtained by modulating data to be received is received from another optical transceiver, the second channel information indicating a channel of the second channel setting optical signal; and a control unit configured to control the wavelength-tunable optical transmission unit and the wavelength-tunable optical reception unit, causing the wavelength-tunable optical transmission unit to repeatedly transmit the first channel setting optical signal while changing a transmission channel of the first channel setting optical signal until the wavelength-tunable optical reception unit receives the second channel setting optical signal when a first instruction signal is received; setting a channel indicated by the second channel information as a channel of an optical signal to be received by the wavelength-tunable optical reception unit when the wavelength-tunable optical reception unit receives the second channel setting optical signal; and setting a channel of an optical signal to be transmitted by the wavelength-tunable optical transmission unit to a first designated channel and setting a channel of an optical signal to be received by the wavelength-tunable optical reception unit to a second designated channel when a second instruction signal designating the first designated channel of the optical signal to be transmitted by the wavelength-tunable optical transmission unit and the second designated channel of the optical signal to be received by the wavelength-tunable optical reception unit are received after the first instruction signal is received.

A non-transitory computer-readable medium storing a program according to one aspect of the present invention causes a computer in an optical transceiver, which includes: a wavelength-tunable optical transmission unit configured to be capable of transmitting a first channel setting optical signal superimposed on a first main signal obtained by modulating data to be transmitted, the first channel setting optical signal including first channel information indicating a channel of the first channel setting optical signal; a wavelength-tunable optical reception unit configured to forward second channel information included in a second channel setting optical signal when the second channel setting optical signal superimposed on a second main signal obtained by modulating data to be received is received from another optical transceiver, the second channel information indicating a channel of the second channel setting optical signal; and a control unit including the computer that performs processing to control the wavelength-tunable optical transmission unit and the wavelength-tunable optical reception unit, to perform a process of causing the wavelength-tunable optical transmission unit to repeatedly transmit the first channel setting optical signal while changing a transmission channel of the first channel setting optical signal until the wavelength-tunable optical reception unit receives the second channel setting optical signal when the first instruction signal is received; a process of setting a channel indicated by the second channel information as a channel of an optical signal to be received by the wavelength-tunable optical reception unit when the wavelength-tunable optical reception unit receives the second channel setting optical signal; and a process of setting a channel of an optical signal to be transmitted by the wavelength-tunable optical transmission unit to a first designated channel and setting a channel of an optical signal to be received by the wavelength-tunable optical reception unit to a second designated channel when a second instruction signal designating the first designated channel of the optical signal to be transmitted by the wavelength-tunable optical transmission unit and the second designated channel of the optical signal to be received by the wavelength-tunable optical reception unit are received after the first instruction signal is received.

Advantageous Effects of Invention

According to the present invention, it is possible to autonomously set channels of optical signals to be transmitted and received by optical transceivers.

BRIEF DESCRIPTION OF DRAWINGS

FIG. 2 is a diagram schematically illustrating a configuration of an optical transmission apparatus according to the first example embodiment and an example of transmission and reception of optical signals.

EXAMPLE EMBODIMENT

Hereinafter, example embodiments of the present invention will be described with reference to the drawings. In each drawing, the same elements are denoted by the same reference signs, and redundant description is omitted as necessary.

First Example Embodiment

Figure 1:
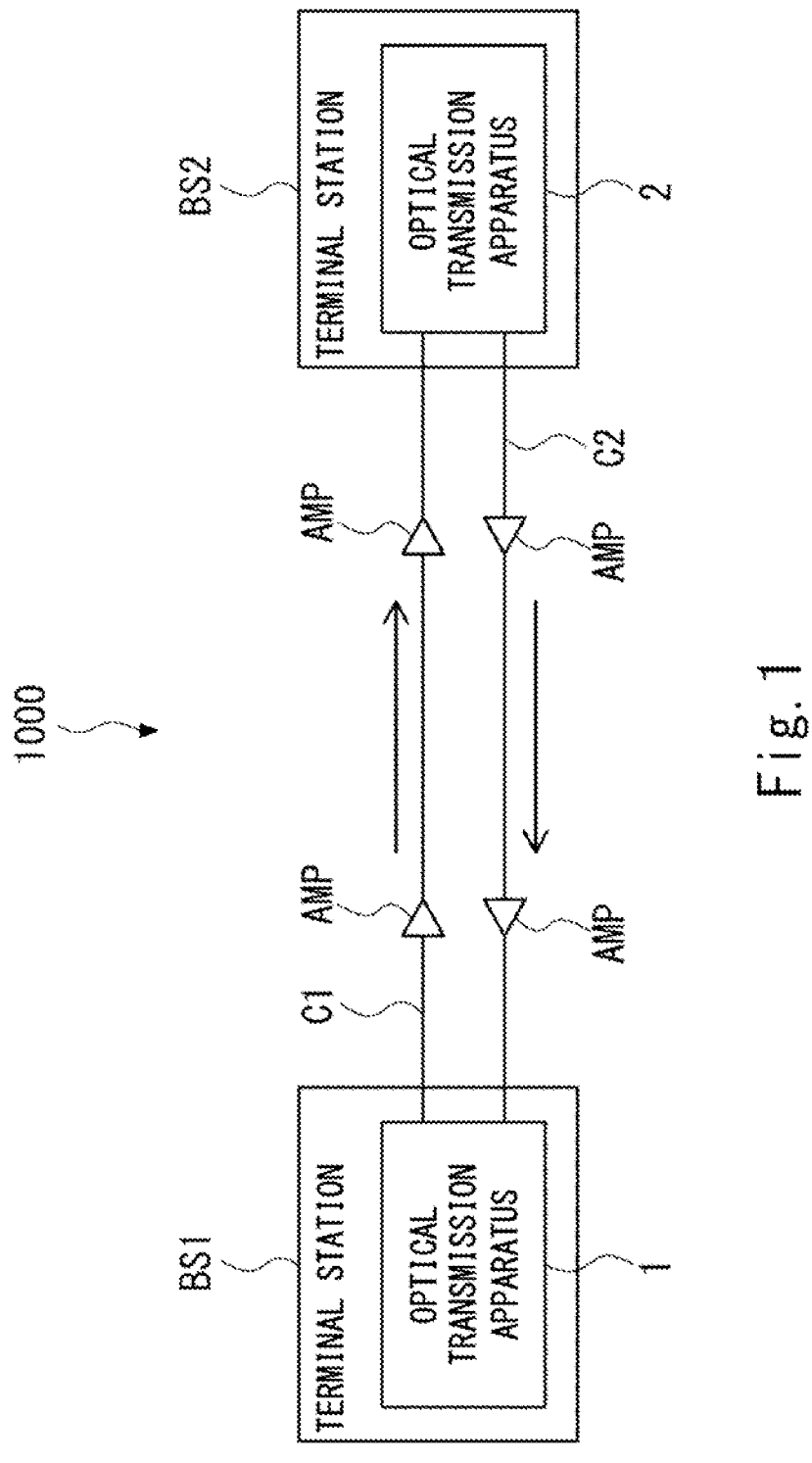
FIG. 1 is a diagram schematically illustrating a basic configuration of an optical communication system according to a first example embodiment.

An optical communication system 1000 according to a first example embodiment will be described. FIG. 1 schematically illustrates a basic configuration of the optical communication system 1000 according to the first example embodiment. In the optical communication system 1000, optical transmission apparatuses 1 and 2 are respectively provided in terminal stations BS1 and BS2 on land. The optical transmission apparatuses 1 and 2 are connected by optical cables C1 and C2. The optical cables C1 and C2 may be laid on land or on the sea floor. In this example, the optical cable C1 is used as a cable for transmitting an optical signal that is transmitted from the optical transmission apparatus 1 to the optical transmission apparatus 2. The optical cable C2 is used as a cable for transmitting an optical signal that is transmitted from the optical transmission apparatus 2 to the optical transmission apparatus 1. Note that one or more optical amplifiers AMP may be inserted into the optical cables C1 and C2 in order to compensate for an optical signal attenuated by the transmission.

FIG. 1 illustrates a simplified configuration of the optical communication system for simplification. For example, one optical transmission apparatus may be connected to be capable of communicating with two or more optical transmission apparatuses by optical cables. Further, an optical add/drop multiplexer that performs ADD/DROP of an optical signal may be inserted into the optical cables as necessary to cause a trunk path branch into branch paths. However, these are merely examples, and it goes without saying that the optical communication system may adopt a configuration having any path (trunk path and branch path) that enables optical communication between any number of optical transmission apparatuses.

A configuration of an optical transmission apparatus will be described. The optical transmission apparatus includes a plurality of optical transceivers, an optical multiplexer that multiplexes optical signals to be transmitted and outputs a multiplexed optical signal, and an optical demultiplexer that demultiplexes a received multiplexed optical signal into each of the optical transceivers. Hereinafter, the optical multiplexer and the optical demultiplexer are integrated and handled as one optical multiplexer/demultiplexer for simplification.

Figure 2:
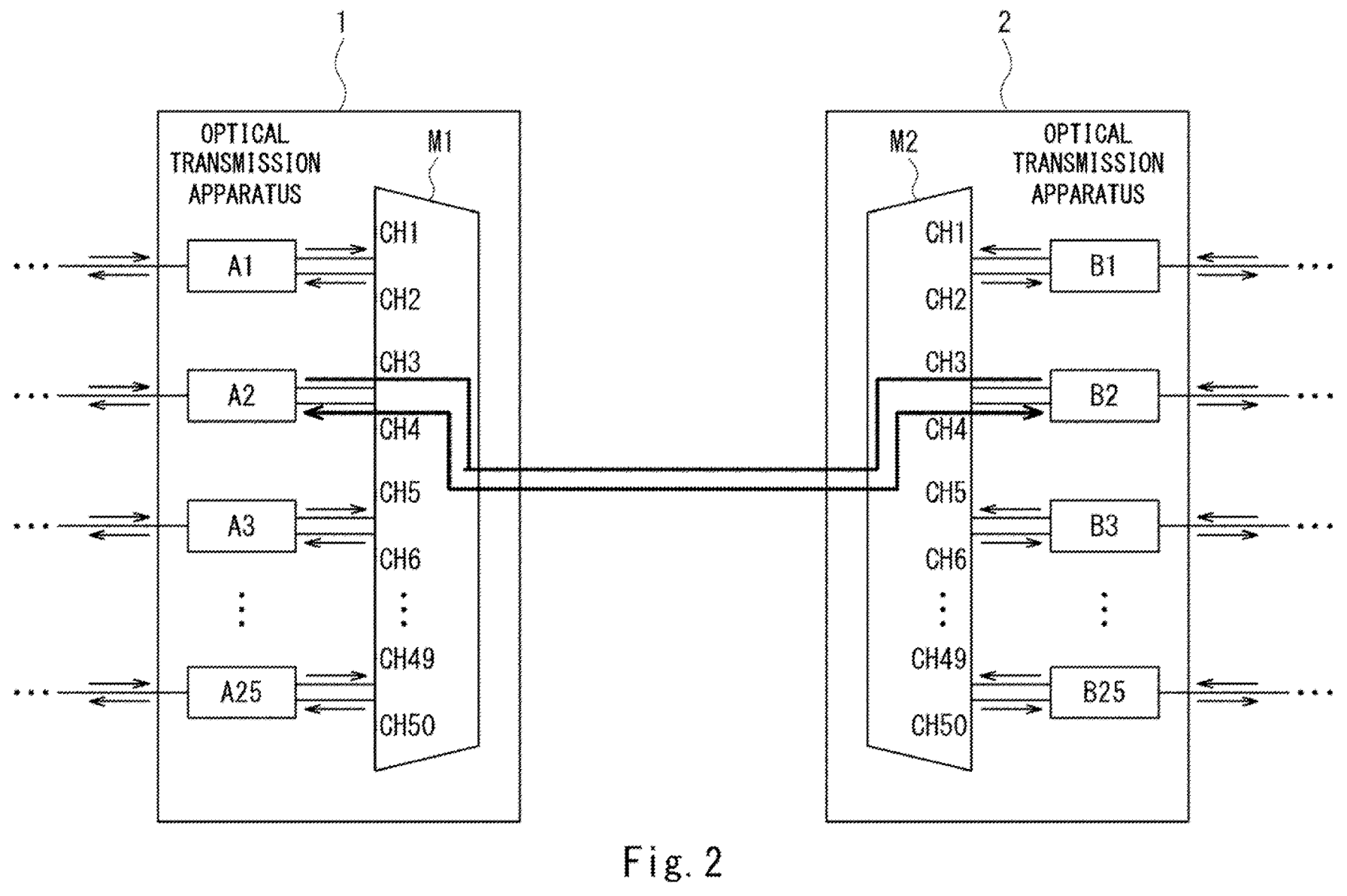

FIG. 2 schematically illustrates configurations of the optical transmission apparatuses 1 and 2 according to the first example embodiment and an example of transmission and reception of an optical signal. The optical transmission apparatus 1 includes a plurality of optical transceivers and an optical multiplexer/demultiplexer M1 (also referred to as a second optical multiplexer/demultiplexer). Here, an example in which the optical transmission apparatus 1 includes 25 optical transceivers A1 to A25 is illustrated. Two different channels are assigned to each of the optical transceivers A1 to A25.

Ports of the optical multiplexer/demultiplexer M1 connected to the optical transceivers are provided as many as the number of channels, and a transmission port and a reception port of an optical transceiver Ai (i is an integer between 1 and 25) are connected to a port of a channel CH(2$i$-1) and a port of a channel CH(2$i$), respectively, of the optical multiplexer/demultiplexer M1. In other words, the channel CH(2$i$-1) for transmission and the channel CH(2$i$) for reception are assigned to the optical transceiver Ai. That is, channels CH1 and CH2, channels CH3 and CH4, channels CH5 and CH6, . . . , and channels CH49, and CH50 are assigned to the optical transceivers A1, A2, A3, . . . , and A25, respectively. In this manner, a specific channel is assigned to each of the two ports of the optical transceiver without overlapping in the optical transmission apparatus.

The optical transmission apparatus 2 has a configuration similar to that of the optical transmission apparatus 1. That is, the optical transmission apparatus 2 includes 25 optical transceivers B1 to B25 and an optical multiplexer/demultiplexer M2 (also referred to as a first optical multiplexer/demultiplexer).

Ports of the optical multiplexer/demultiplexer M2 connected to the optical transceivers are provided as many as the number of channels, and a reception port and a transmission port of an optical transceiver B1 are connected to a port of the channel CH(2$i$-1) and a port of the channel CH(2$i$), respectively, of the optical multiplexer/demultiplexer M2. In other words, the channel CH(2$i$) for transmission and the channel CH(2$i$-1) for reception are assigned to the optical transceiver Bi. That is, the channels CH1 and CH2, the channels CH3 and CH4, the channels CH5 and CH6, . . . , and the channels CH49, and CH50 are assigned to the optical transceivers B1, B2, B3, . . . , and B25, respectively. In this manner, a specific channel is assigned to each of the two ports of the optical transceiver without overlapping in the optical transmission apparatus.

With the above configuration, two common channels are assigned to the optical transceiver Ai and the optical transceiver Bi, and transmission and reception of an optical signal can be performed using these two channels.

In this example, a transmission/reception path of an optical signal is illustrated by focusing on the optical transceiver A2 of the optical transmission apparatus 1 and the optical transceiver B2 of the optical transmission apparatus 2. The optical transceiver A2 transmits an optical signal using the channel CH3, and the transmitted optical signal of the channel CH3 is received by the optical transceiver B2. Further, the optical transceiver B2 transmits an optical signal using the channel CH4, and the transmitted optical signal of the channel CH4 is received by the optical transceiver A2.

Note that FIG. 2 merely focuses on the optical transceiver A2 and the optical transceiver B2 for simplification of description, and it goes without saying that other optical transceivers can similarly transmit and receive optical signals using two channels.

In this manner, a channel to be used for an optical transceiver on a transmission side and an optical transceiver on a reception side is set for transmission and reception of an optical signal of a specific channel. In general, the work of setting a channel for an optical transceiver is performed as initial setting work performed when the optical transceiver is attached to an optical transmission apparatus.

However, for example, in a case where a maximum of 50 channels are used as in the above-described optical communication system, it is necessary to perform the setting work for two channels for each of a total of 50 optical transceivers in the two optical transmission apparatuses, that is, 100 times. However, if this setting work is manually performed, there is a problem that a required work time is enormous. Further, it is also necessary to perform the setting work a lot of times without any mistake, and thus, it can be considered that there is a problem in the manual setting work even from the viewpoint of reliability.

In this regard, in order to cope with such problems, the present example embodiment describes an optical transceiver that autonomously performs channel setting processing when the optical transceiver is attached to an optical transmission apparatus.

For example, in a case where the optical transceiver A2 and the optical transceiver B2 are attached to the optical transmission apparatuses, the optical transceiver A2 and the optical transceiver B2 autonomously execute the channel setting processing. At this time, channel setting optical signals are transmitted and received between the optical transceiver A2 and the optical transceiver B2.

Figure 3:
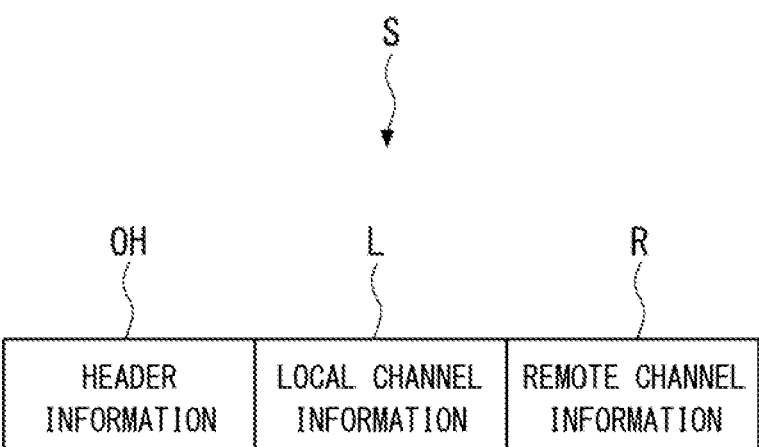
FIG. 3 is a diagram schematically illustrating a configuration of a channel setting optical signal.

FIG. 3 schematically illustrates a configuration of the channel setting optical signal. A channel setting optical signal S includes at least local channel information L and remote channel information R held in an optical transceiver. The local channel information L is information indicating a channel of the transmitted channel setting optical signal S when the optical transceiver transmits the channel setting optical signal S in the channel setting processing. The remote channel information R is information indicating a channel of the received channel setting optical signal S when the optical transceiver receives the channel setting optical signal S in the channel setting processing. Note that the channel setting optical signal S may include other information as necessary. FIG. 3 illustrates an example in which the channel setting optical signal S includes header information OH.

In the present example embodiment, the channel setting optical signal is transmitted by being superimposed on a main signal modulated based on a data signal to be transmitted and received, the data signal being exchanged between two optical transceivers (for example, the above-described optical transceivers A2 and B2) that transmit and receive optical signals. The channel setting optical signal can be transmitted by being superimposed on the main signal by using modulation scheme such as amplitude-shift keying (ASK), phase-shift keying (PSK), and frequency-shift keying (FSK). Note that the modulation schemes described here are merely examples, and various modulation schemes can be applied as long as the channel setting optical signal can be superimposed on the main signal.

Figure 4:
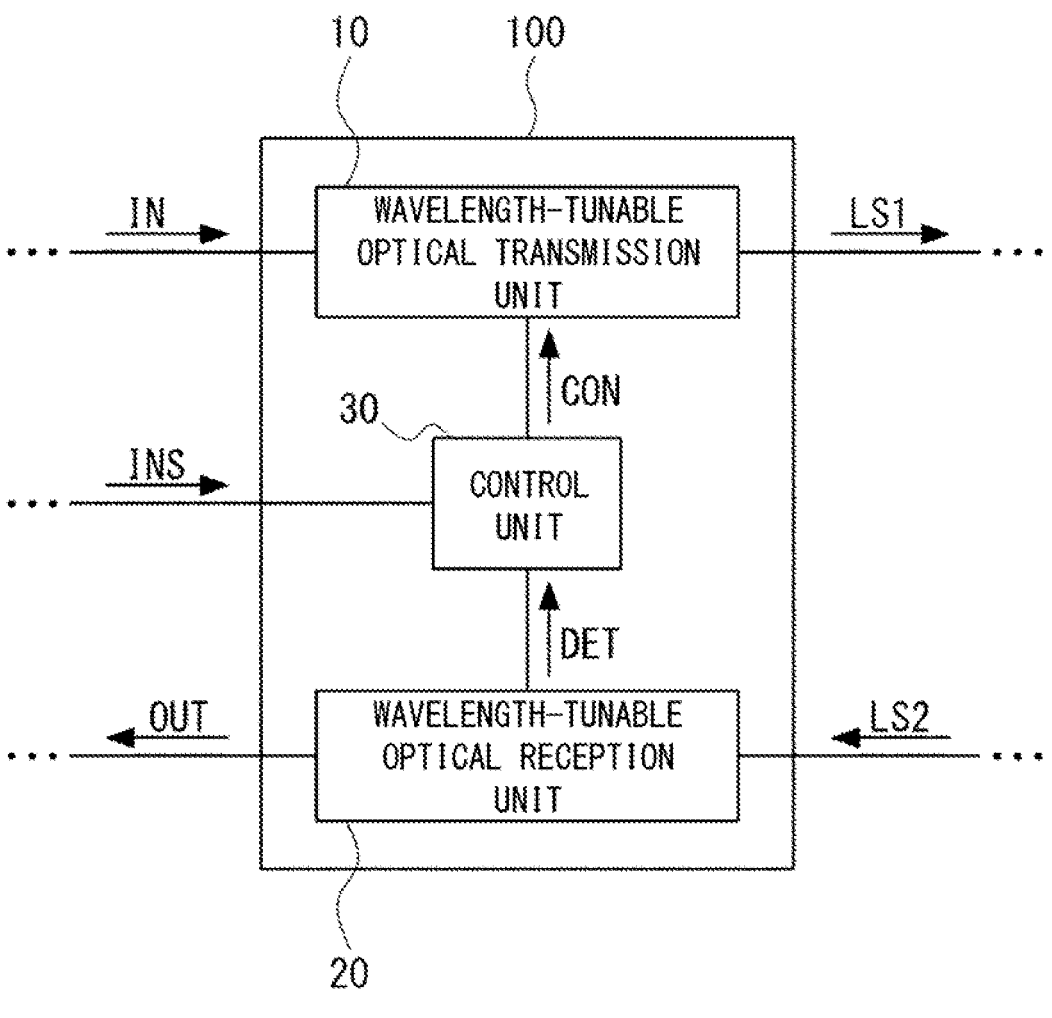
FIG. 4 is a diagram schematically illustrating a basic configuration of an optical transceiver according to the first example embodiment.

Here, a configuration of an optical transceiver according to the present example embodiment will be described. FIG. 4 schematically illustrates a basic configuration of the optical transceiver according to the first example embodiment.

Figure 5:
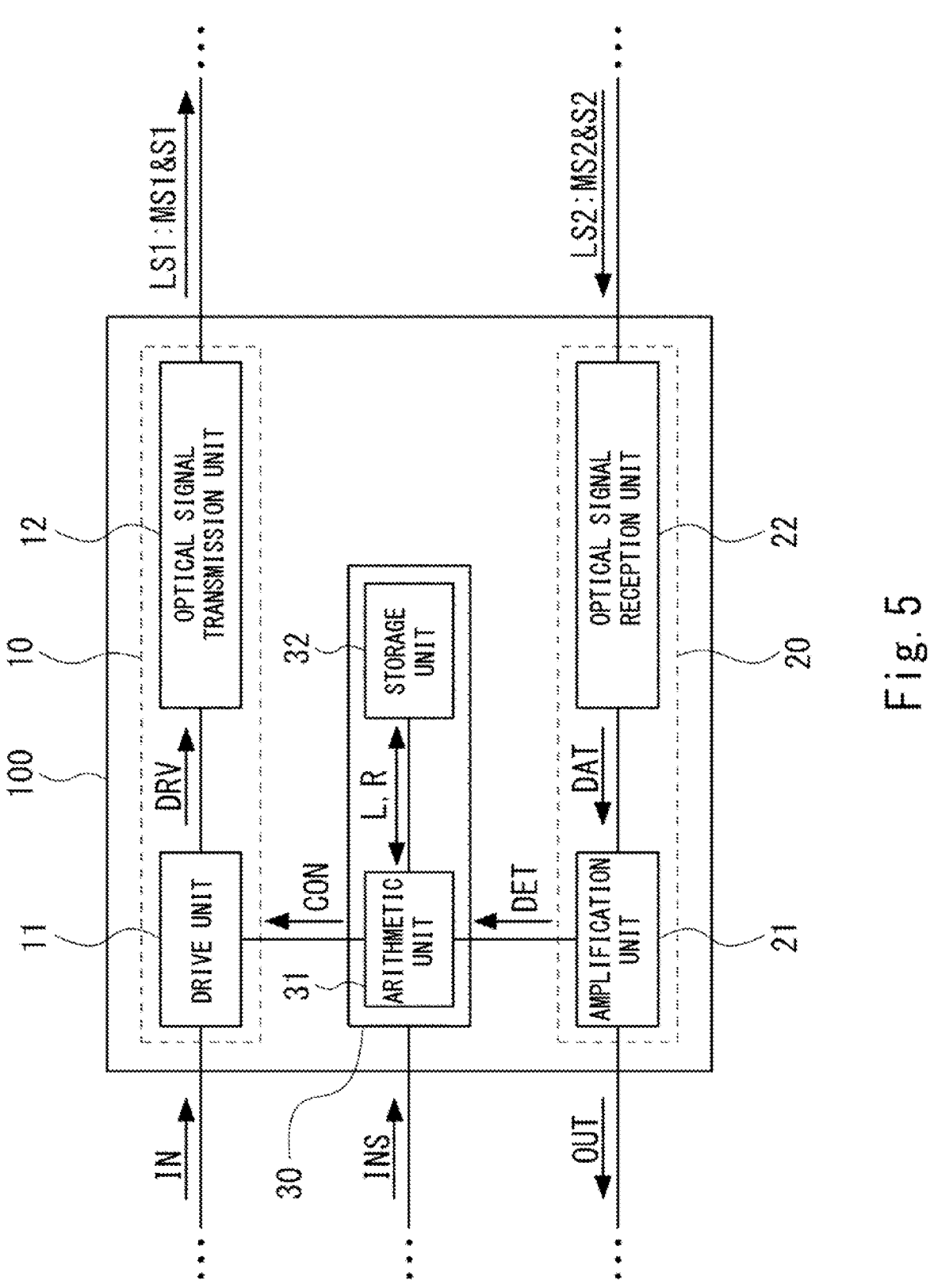
FIG. 5 is a diagram illustrating the configuration of the optical transceiver according to the first example embodiment in more detail.

FIG. 5 illustrates a configuration of the optical transceiver according to the first example embodiment in more detail. Note that the optical transceivers A1 to A25 and B1 to B25 have a similar configuration here, and thus, an optical transceiver 100 having the same structure as them will be described as a representative.

The optical transceiver 100 includes a wavelength-tunable optical transmission unit 10, a wavelength-tunable optical reception unit 20, and a control unit 30. The control unit 30 controls operations of the wavelength-tunable optical transmission unit 10 and the wavelength-tunable optical reception unit 20 according to an instruction signal INS provided from an optical transmission apparatus on which the optical transceiver 100 is mounted, for example. The control unit 30 includes an arithmetic unit 31 and a storage unit 32.

The wavelength-tunable optical transmission unit 10 is configured to be capable of changing a wavelength, that is, a channel of an optical signal to be transmitted. The wavelength-tunable optical transmission unit 10 includes a drive unit 11 and an optical signal transmission unit 12. The drive unit 11 outputs a drive signal DRV to the optical signal transmission unit 12 based on a received main signal (data signal) IN. The wavelength-tunable optical signal transmission unit 12 is configured as, for example, a transmitter optical sub-assembly (TOSA), and is configured to be capable of outputting an optical signal LS1 modulated according to the drive signal DRV. As described above, the optical transceiver 100 can output a channel setting optical signal superimposed on the main signal. Therefore, the optical signal LS1 modulated according to the drive signal DRV is an optical signal including only a main signal MS1 or an optical signal in which a channel setting optical signal S1 is superimposed on the main signal MS1.

The wavelength-tunable optical reception unit 20 is configured to be capable of changing a wavelength, that is, a channel of an optical signal to be received. The wavelength-tunable optical reception unit 20 includes an amplification unit 21 and an optical signal reception unit 22. The wavelength-tunable optical signal reception unit 22 is configured as, for example, a receiver optical sub-assembly (ROSA), converts a received optical signal LS2 into an output signal DAT which is an electrical signal, and outputs the output signal to the amplification unit 21. The amplification unit 21 is configured as, for example, a limiting amplifier, amplifies the output signal DAT to a predetermined amplitude, and outputs the amplified output signal OUT to the outside of the optical transceiver 100, for example, the optical transmission apparatus in which the optical transceiver 100 is mounted. As described above, the optical transceiver 100 can receive an optical signal in which a channel setting optical signal is superimposed on a main signal. Therefore, the optical signal LS2 is an optical signal including only a main signal MS2 or a signal in which a channel setting optical signal S2 is superimposed on the main signal MS2. When an optical signal in which the channel setting optical signal S2 is superimposed on a main signal MS2 is received, the amplification unit 21 separates the output signal OUT based on the main signal MS2 from the output signal DAT and outputs the separated output signal, and separates a detection signal DET based on the channel setting optical signal S2 from the output signal DAT and outputs the separated detection signal to the arithmetic unit 31 of the control unit 30.

Figure 6:
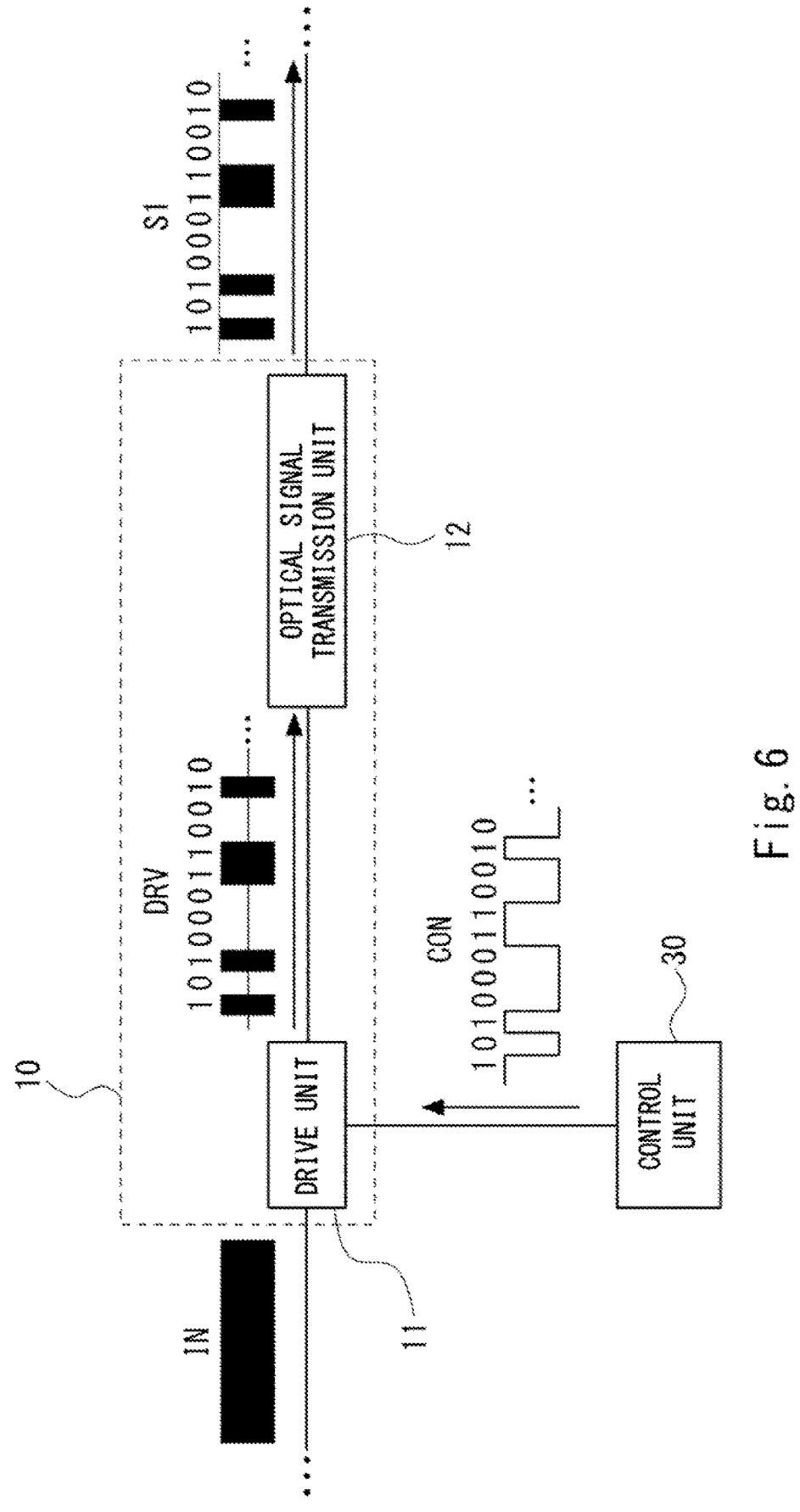
FIG. 6 is a diagram illustrating transmission of the channel setting optical signal in the optical transceiver according to the first example embodiment.

Next, transmission of a channel setting optical signal in the optical transceiver 100 will be described. FIG. 6 illustrates transmission of a channel setting optical signal S1 in the optical transceiver 100. Note that FIG. 6 focuses on the channel setting optical signal S1, and thus, does not illustrate the main signal MS1. The arithmetic unit 31 of the control unit 30 can superimpose a signal for channel setting on the drive signal DRV output from the drive unit 11 by giving a control signal CON to the drive unit 11. At this time, the local channel information L and the remote channel information R are added to the control signal CON so that the channel setting optical signal S1 superimposed on the main signal MS1 output by the optical signal transmission unit 12 includes the local channel information L and the remote channel information R. The arithmetic unit 31 can appropriately read the local channel information L and the remote channel information R included in the channel setting signal S1 from the storage unit 32. FIG. 6 illustrates an example of the channel setting optical signal S1, and it goes without saying that the channel setting optical signal S1 can be appropriately modulated according to a modulation scheme so as to be superimposed on the main signal MS1.

Figure 7:
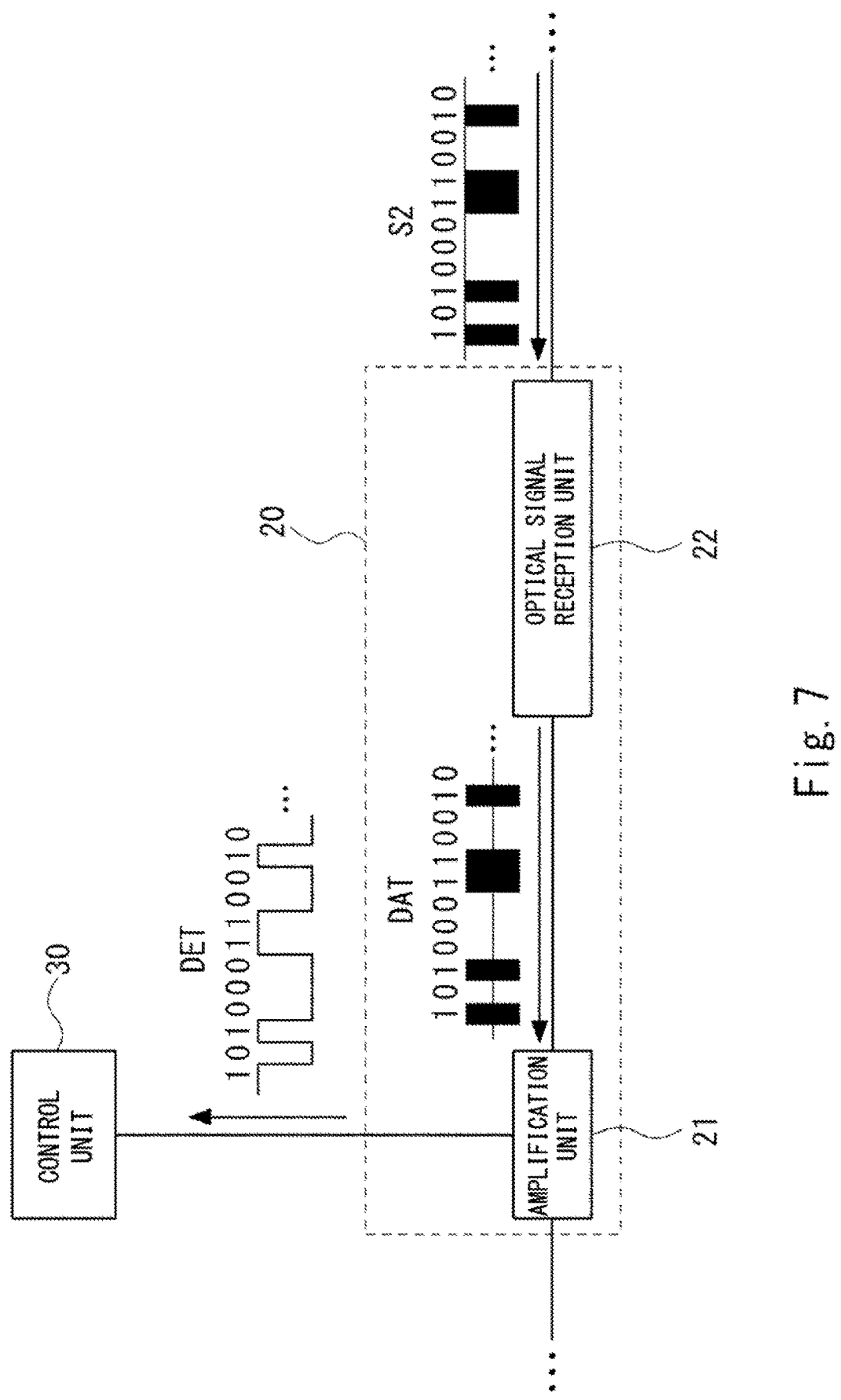
FIG. 7 is a diagram illustrating reception of the channel setting optical signal in the optical transceiver according to the first example embodiment.

Next, reception of a channel setting optical signal in the optical transceiver 100 will be described. FIG. 7 illustrates reception of a channel setting optical signal S2 in the optical transceiver 100. FIG. 7 focuses on the channel setting optical signal S2, and thus, does not illustrate the main signal MS2. When the optical signal reception unit 22 receives an optical signal in which the channel setting optical signal S2 is superimposed, the amplification unit 21 outputs the detection signal DET based on the channel setting optical signal S2 to the arithmetic unit 31 of the control unit 30. As a result, the control unit 30 can receive the local channel information L and the remote channel information R. The arithmetic unit 31 can appropriately write the received local channel information L and remote channel information R in the storage unit 32. FIG. 7 illustrates an example of the channel setting optical signal S2, and it goes without saying that the channel setting optical signal S2 can be appropriately modulated according to a modulation scheme so as to be superimposed on the main signal MS2.

Figure 8:
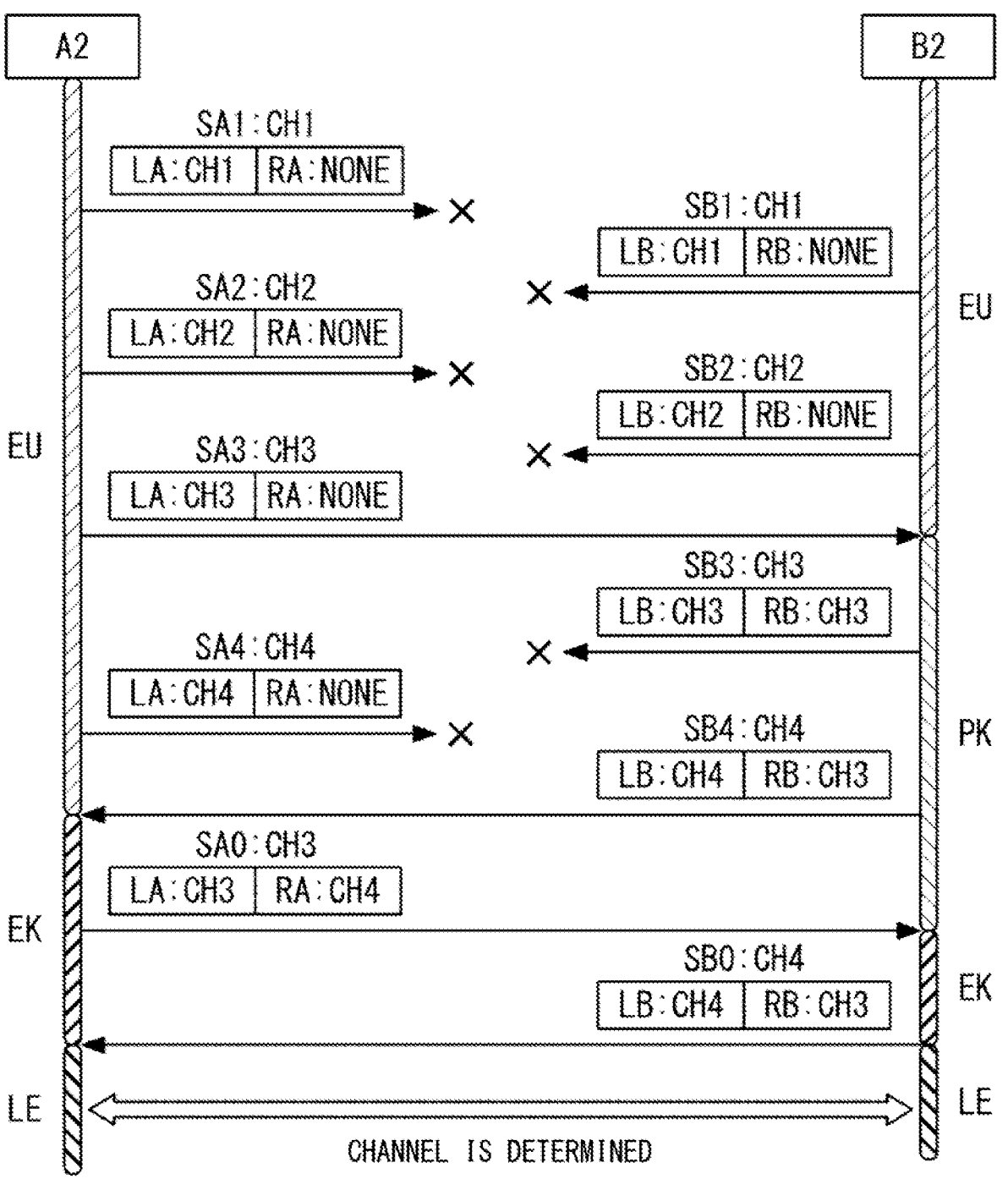
FIG. 8 is a diagram illustrating an example of channel setting optical signals transmitted and received between two optical transceivers in channel setting processing.
Figure 9:
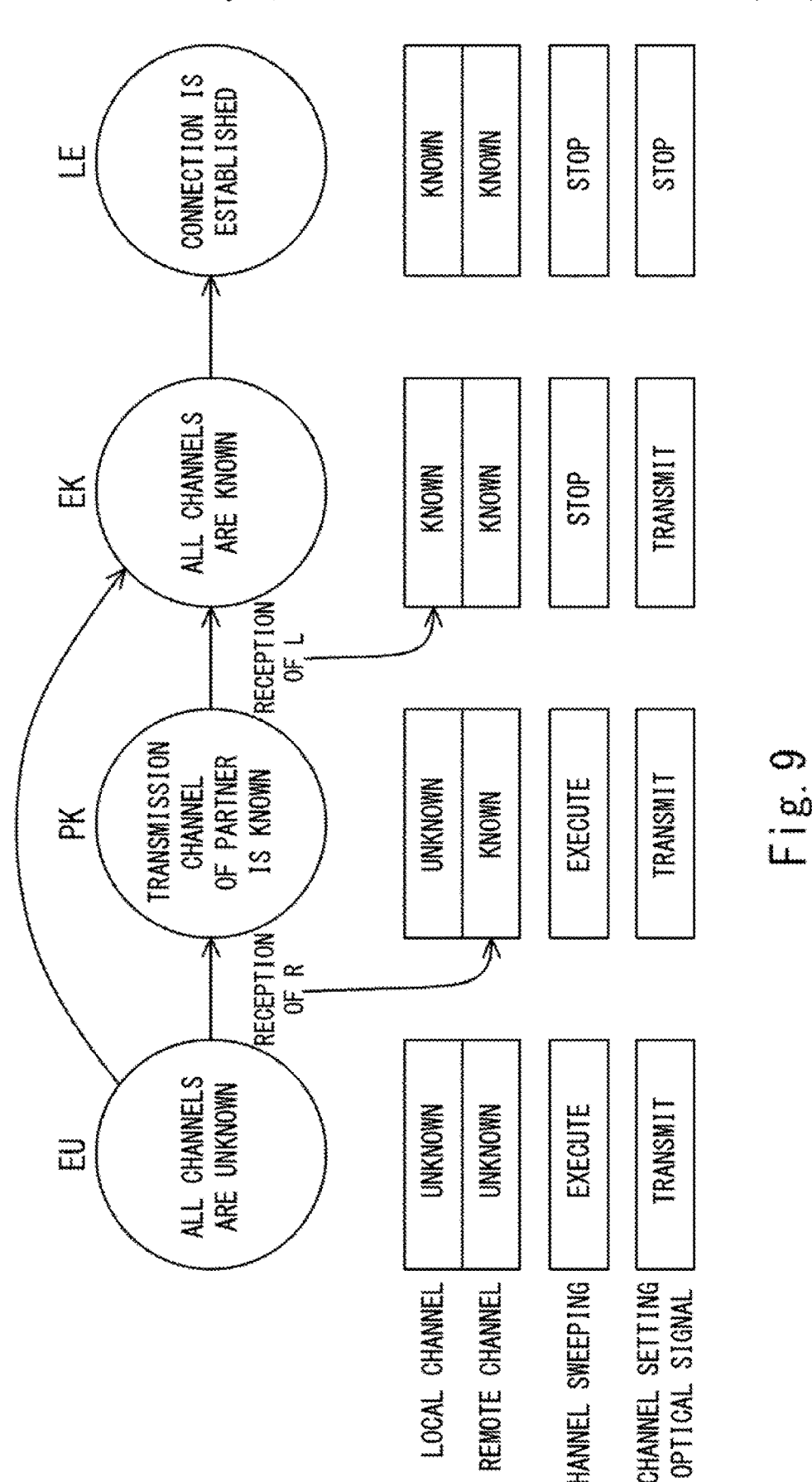
FIG. 9 is a diagram illustrating a state transition the channel setting processing.

Next, the above-described channel setting processing of the optical transceiver using the channel setting optical signal will be described. The optical transceiver A2 and the optical transceiver B2 transmit channel setting optical signals while changing the local channel information L, that is, sweeping a local channel, thereby determining channels to be used for transmission and reception of optical signals therebetween in the following procedure. FIG. 8 illustrates an example of the channel setting optical signals transmitted and received between the optical transceiver A2 and the optical transceiver B2 in the channel setting processing. FIG. 9 illustrates a state transition in the channel setting processing.

At the time of starting the channel setting processing, the optical transceivers A2 and B2 are in a state (hereinafter, a state EU: Each channel Unknown) where a transmission channel and a reception channel that need to be set are unknown. That is, both an optical transceiver serving as a transmission destination and an optical transceiver that transmits a received optical signal are not specified in the state.

Thereafter, the optical transceivers A2 and B2 repeatedly transmit the channel setting optical signals while sweeping a local channel. Here, it is assumed that the local channel is swept in ascending order starting from the channel CH1.

Note that the optical transceiver B2 and the optical transceiver A2 are also referred to as a first optical transceiver and a second optical transceiver, respectively, hereinafter. The channel setting optical signal output from the optical transceiver B2 is also referred to as a first channel setting optical signal. The channel setting optical signal output from the optical transceiver A2 is also referred to as a second channel setting optical signal.

The channel CH3 and the channel CH4 are also referred to as a first channel and a second channel, respectively.

The local channel information LB of the optical transceiver B2 is also referred to as first channel information, and the local channel information LA of the optical transceiver A2 is also referred to as second channel information. The remote channel information RB of the optical transceiver B2 is also referred to as third channel information, and the remote channel information RA of the optical transceiver A2 is also referred to as fourth channel information.

(1) SA1/LA: CH1 and RA: None

In the example of FIG. 8, the optical transceiver A2 first transmits a channel setting optical signal SA1 for the channel CH1 in which the local channel information LA is the channel CH1 and the remote channel information RA is empty (NONE). In this example, the channel CH1 is a channel to be used for transmission from the optical transceiver A1 to the optical transceiver B1. That is, the reception port of the optical transceiver B1 is connected to the port of the channel CH1 in the optical multiplexer/demultiplexer M2 of the optical transmission apparatus 2. Therefore, the channel setting optical signal SA1 is blocked by the optical multiplexer/demultiplexer M2 and does not reach the optical transceiver B2.

(2) SB1/LB: CH1 and RB: None

Next, the optical transceiver B2 transmits a channel setting optical signal SB1 for the channel CH1 in which the local channel information LB is the channel CH1 and the remote channel information RB is empty (NONE). Since the transmission port of the optical transceiver A1 is connected to the port of the channel CH1 in the optical multiplexer/demultiplexer M1 of the optical transmission apparatus 1, the channel setting optical signal SB1 is blocked by the optical multiplexer/demultiplexer M1 and does not reach the optical transceiver A2.

(3) SA2/LA: CH2 and RA: None

Next, the optical transceiver A2 transmits a channel setting optical signal SA2 for the channel CH2 in which the local channel information LA is the channel CH2 and the remote channel information RA is empty (NONE). In this example, the channel CH2 is a channel to be used for transmission from the optical transceiver B1 to the optical transceiver A1. That is, the transmission port of the optical transceiver B1 is connected to the port of the channel CH2 in the optical multiplexer/demultiplexer M2 of the optical transmission apparatus 2. Therefore, the channel setting optical signal SA2 is blocked by the optical multiplexer/demultiplexer M2 and does not reach the optical transceiver B2.

(4) SB2/LA: CH2 and RA: None

Next, the optical transceiver B2 transmits a channel setting optical signal SB2 for the channel CH2 in which the local channel information LB is the channel CH2 and the remote channel information RB is empty (NONE). Since the reception port of the optical transceiver A1 is connected to the port of the channel CH2 in the optical multiplexer/demultiplexer M1 of the optical transmission apparatus 1, the channel setting optical signal SB2 is blocked by the optical multiplexer/demultiplexer M1 and does not reach the optical transceiver A2.

(5) SA3/LA: CH3, RA: None, and State Transition: EU→PK

Next, the optical transceiver A2 transmits a channel setting optical signal SA3 for the channel CH3 in which the local channel information L is the channel CH3 and the remote channel information R is empty (NONE). In this example, the channel CH3 is a channel to be used for transmission from the optical transceiver A2 to the optical transceiver B2. That is, the reception port of the optical transceiver B2 is connected to the port of the channel CH3 in the optical multiplexer/demultiplexer M2 of the optical transmission apparatus 2. Therefore, the channel setting optical signal SA3 for the channel CH3 is received by the optical transceiver B2 via the optical multiplexer/demultiplexer M2.

As a result, the optical transceiver B2 can receive the channel CH3 as the local channel information LA of the optical transceiver A2. Since the local channel information LA of the optical transceiver A2 is the remote channel information RB for the optical transceiver B2, the optical transceiver B2 fixes the remote channel information RB to the channel CH3.

At this time, the optical transceiver B2 is in a state (state PK: Partner CH Known) in which a transmission channel of the optical transceiver A2 as a partner is detected, and the state transitions from EU to PK.

(6) SB4/LB: CH3 and RB: None

Next, the optical transceiver B2 transmits a channel setting optical signal SB3 for the channel CH3 in which the local channel information LB is the channel CH3 and the remote channel information RB is the channel CH3. Since the transmission port of the optical transceiver A2 is connected to the port of the channel CH3 in the optical multiplexer/demultiplexer M1 of the optical transmission apparatus 1, the channel setting optical signal SB3 for the channel CH3 is blocked by the optical multiplexer/demultiplexer M1 and does not reach the optical transceiver A2.

(7) SA4/LA: CH4 and RA: None

Next, the optical transceiver A2 transmits a channel setting optical signal SA4 for the channel CH4 in which the local channel information LA is the channel CH4 and the remote channel information RA is empty (NONE). In this example, the channel CH4 is a channel to be used for transmission from the optical transceiver B2 to the optical transceiver A2. That is, the transmission port of the optical transceiver B2 is connected to the port of the channel CH4 in the optical multiplexer/demultiplexer M2 of the optical transmission apparatus 2. Therefore, the channel setting optical signal SA4 for the channel CH4 is blocked by the optical multiplexer/demultiplexer M2 and does not reach the optical transceiver B2.

(8) SB4/LB: CH4, RA: CH3, and State Transition: EU→EK

Next, the optical transceiver B2 transmits a channel setting optical signal SB4 for the channel CH4 in which the local channel information LB is the channel CH4 and the remote channel information RB is the channel CH3. The reception port of the optical transceiver B2 is connected to the port of the channel CH4 in the optical multiplexer/demultiplexer M1 of the optical transmission apparatus 1. Therefore, the channel setting optical signal SB4 for the channel CH4 is received by the optical transceiver A2 via the optical multiplexer/demultiplexer M1.

As a result, the optical transceiver A2 can receive the channel CH4 as the local channel information LB of the optical transceiver B2. Since the local channel information LB of the optical transceiver B2 is the remote channel information RA for the optical transceiver A2, the optical transceiver A2 fixes the remote channel information RA to the channel CH4.

Further, the optical transceiver A2 can receive the channel CH3 as the remote channel information RB of the optical transceiver B2. Since the remote channel information RB of the optical transceiver B2 is the local channel information LA for the optical transceiver A2, the optical transceiver A2 fixes the local channel information LA to the channel CH3. Note that the transmission channel of the optical transceiver A2 is set by fixing the local channel information LA to the channel CH3, and thus, the optical transceiver A2 stops sweeping a channel.

At this time, the optical transceiver A2 is in a state (state EK: Each CH Known) in which a transmission channel of the optical transceiver B2 as a partner and a channel through which transmission from the optical transceiver A2 to the optical transceiver B2 is possible are detected, and the state transitions from EU to EK.

(9) SA0/LA: CH3, RA: CH4, and State Transition: PK→EK

Next, the optical transceiver A2 transmits a channel setting optical signal SA0 for the channel CH3 in which the local channel information LA is fixed to the channel CH3 and the remote channel information RA is fixed to the channel CH4. The channel setting optical signal SA0 for the channel CH3 is received by the optical transceiver B2.

In this case, the optical transceiver B2 can receive the channel CH4 as the remote channel information RA of the optical transceiver A2. Since the remote channel information RA of the optical transceiver A2 is the local channel information LB for the optical transceiver B2, the optical transceiver B2 fixes the local channel information LB to the channel CH4. Note that the transmission channel of the optical transceiver B2 is set by fixing the local channel information LB to the channel CH4, and thus, the optical transceiver B2 stops the channel sweeping.

At this time, the optical transceiver B2 is in a state (state EK) in which the transmission channel of the optical transceiver A2 as the partner and a channel through which transmission from the optical transceiver B2 to the optical transceiver A2 is possible are detected, and the state transitions from PK to EK.

(10) SB0/LB: CH4, RB: CH3, and State Transition: EK→LE

Next, the optical transceiver B2 transmits a channel setting optical signal SB0 for the channel CH4 in which the local channel information LB is fixed to the channel CH4 and the remote channel information RB is fixed to the channel CH3. The channel setting optical signal SB0 for the channel CH4 is received by the optical transceiver A2.

In this case, the optical transceivers A2 and B2 can confirm that the local channel information LA of the optical transceiver A2 and the remote channel information RB of the optical transceiver B2 coincide as the channel CH3, and the local channel information LB of the optical transceiver B2 and the remote channel information RA of the optical transceiver A2 coincide as the channel CH4. Therefore, in this case, the optical transceivers A2 and B2 can confirm that the channel to be used for transmission and a channel to be used for reception have been determined. Therefore, since no further channel setting processing is required, the optical transceivers A2 and B2 end the channel setting processing assuming that a link-established state (state LE: Link Established) has been obtained.

As a result, after the channel setting processing is completed, the optical transceiver A2 and the optical transceiver B2 can transmit and receive optical signals using the channels CH3 and CH4.

As described above, according to the present configuration, an optical transceiver can autonomously set a channel of an optical signal to be transmitted and a channel of an optical signal to be received by referring to information included in a received channel setting signal.

As a result, a time required for channel setting of the optical transceiver can be shortened, for example, in a case where many channels are used as in the above-described optical communication system.

In the manual channel setting work, it is conceivable that a work time in units of minutes, for example, a work time of about 10 minutes is required for work of setting one channel. On the other hand, according to the present configuration, automatic setting of one channel can be performed in a setting time in units of seconds, for example, in a setting time of about several seconds although there is a variation depending on a configuration of the optical communication system. In this manner, it can be understood that the time required for channel setting of the optical transceiver can be significantly shortened according to the present configuration.

Further, since the optical transceiver autonomously performs the channel setting, not only the manual work of a worker can be reduced, but also the worker can perform other work during the channel setting processing, which is advantageous in terms of labor saving.

Furthermore, since the optical transceiver can autonomously perform the channel setting, it is possible to prevent a mistake, such as setting a wrong channel, which is likely to be generated by the manual channel setting work, and it is also possible to improve reliability of the channel setting.

Note that there may be a case where optical transceivers fewer than the maximum installable number are installed on an optical transmission apparatus and started to operate, and thereafter, an additional optical transceiver is installed. In this case, in order to manually perform channel setting, it is necessary to perform complicated work such as investigating a channel that is already used and setting a channel other than the channel that is being used. On the other hand, in the optical transceiver according to the present example embodiment, the channel setting can be autonomously performed even if a channel that is already used is not known, which is also advantageous in terms of time reduction and labor saving of work at the time of installing an additional optical transceiver.

Although the above description has focused on the optical transceivers A2 and B2, it goes without saying that the channel setting processing can be similarly executed for the other optical transceivers A1, A3 to A25, B1, and B3 to B25.

Note that the case where the optical transceiver changes the channel of the channel setting optical signal in ascending order from the channel CH1 has been described in the above description, but this is merely an example. For example, the optical transceiver may change the channel of the channel setting optical signal in descending order. Further, for example, the optical transceiver may change the channel of the channel setting optical signal in any order other than the descending order and the ascending order.

Second Example Embodiment

Although the optical transceiver that autonomously performs the channel setting has been described in the first example embodiment, work can be sometimes made efficient by manually performing the channel setting in a case where a channel to be used by the optical transceiver is known in advance. Although the optical transceiver according to the first example embodiment sweeps a channel when performing the channel setting, there may be a case where the number of swept channels increases until reaching a channel to be set. In this case, it takes a long time to complete the channel setting. On the other hand, in the case where the channel to be used by the optical transceiver is known, the channel sweeping can be reduced by manually performing the channel setting even after the autonomous channel setting is started. As a result, a time required for the channel setting can be reduced, and the efficiency of the channel setting work can be expected.

Figure 10:
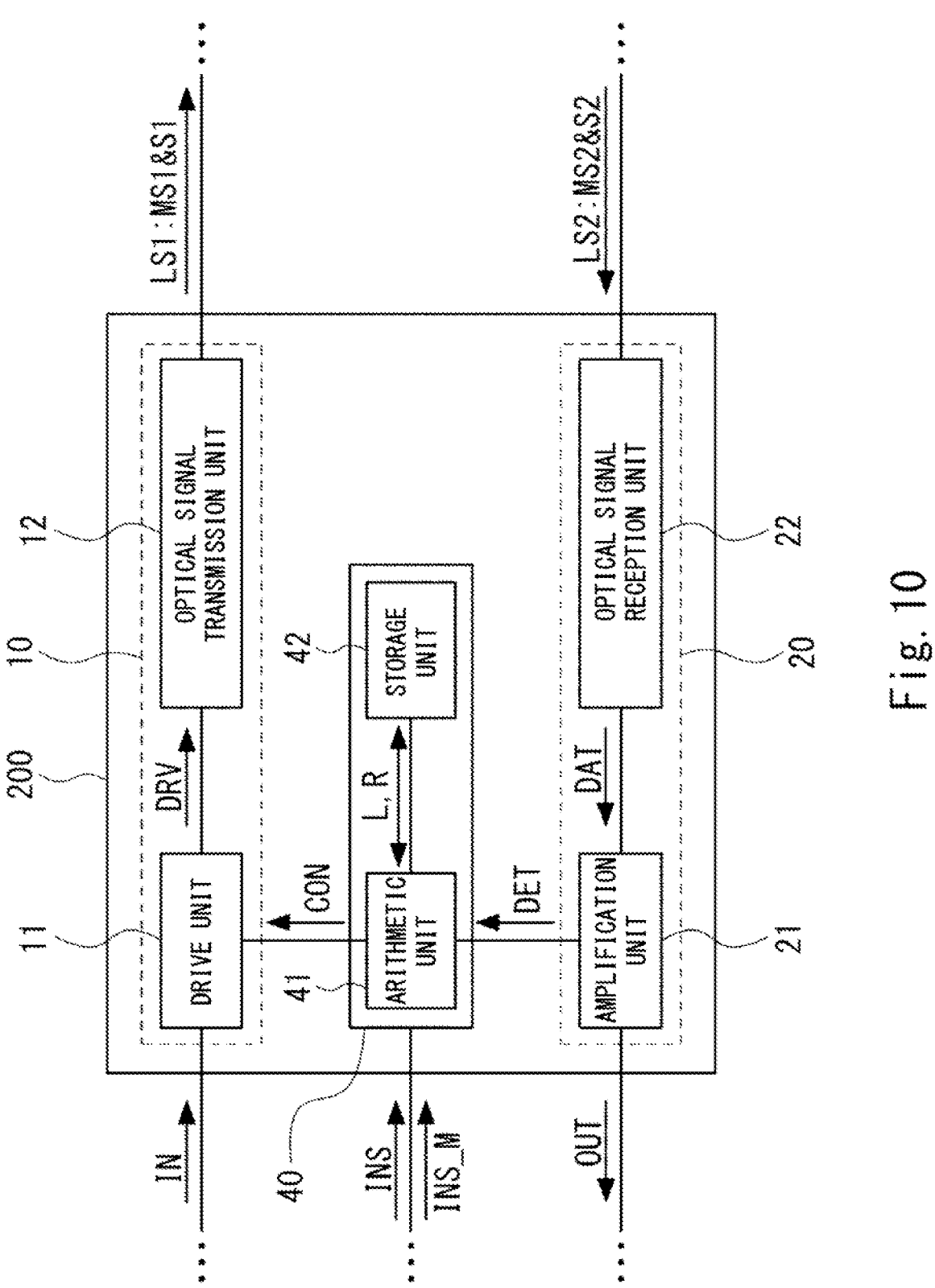
FIG. 10 is a diagram schematically illustrating a configuration of an optical transceiver according to a second example embodiment.

In this regard, an optical transceiver capable of not only autonomous channel setting but also manual channel setting will be described in the present example embodiment. FIG. 10 schematically illustrates a configuration of an optical transceiver 200 according to a second example embodiment. The optical transceiver 200 has a configuration in which the control unit 30 of the optical transceiver 100 is replaced with a control unit 40. An arithmetic unit 41 and a storage unit 42 of the control unit 40 correspond to the arithmetic unit 31 and the storage unit 32 of the control unit 30, respectively. The control unit 40 is configured to be able to perform channel setting according to an instruction signal INS_M, which is given from a user of the optical transceiver 200 or an apparatus such as a host apparatus connected to the optical transceiver 200 and instructs the manual channel setting in addition to operations similar to those of the control unit 30.

Next, manual channel setting processing in the present example embodiment will be described. Here, similarly to FIG. 2, it is assumed that the optical transmission apparatus 1 is provided with the optical transceivers A1 to A25 each having the same configuration as the optical transceiver 200, and the optical transmission apparatus 2 is provided with the optical transceivers B1 to B25 each having the same configuration as the optical transceiver 200.

Similarly to the first example embodiment, when the instruction signal INS is received, the optical transceiver A2 and the optical transceiver B2 transmit channel setting optical signals while changing the local channel information L, that is, sweeping a local channel, thereby starting autonomous channel setting.

However, the present example embodiment assumes that it is known in advance that the channel CH3 is assigned as a transmission channel of the optical transceiver A2 and the channel CH4 is assigned as a transmission channel of the optical transceiver B2. Therefore, in order to manually perform channel setting after the start of the autonomous channel setting, a user gives the optical transceiver A2 an instruction signal INS_M for designating channels to be used for transmission and reception.

Figure 11:
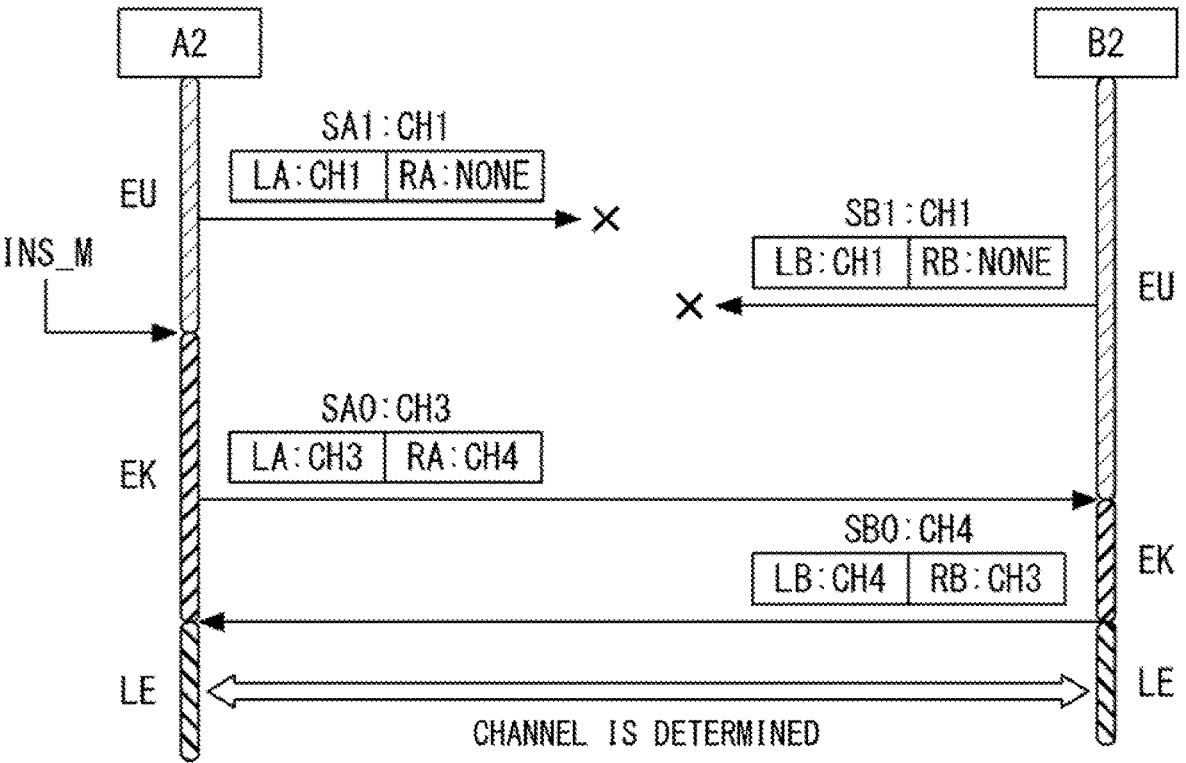
FIG. 11 is a diagram illustrating an example of channel setting optical signals transmitted and received between two optical transceivers in channel setting processing in the second example embodiment.

Hereinafter, a channel setting operation will be described in order. FIG. 11 illustrates an example of channel setting optical signals transmitted and received between the optical transceiver A2 and the optical transceiver B2 in channel setting processing in the second example embodiment. Here, an example will be described in which the instruction signal INS_M is given to the optical transceiver A2 and the manual channel setting is performed after each of the optical transceiver A2 and the optical transceiver B2 transmits a channel setting signal once.

(1) SA1/LA: CH1 and RA: None

In the example of FIG. 11, similarly to the example of FIG. 8, the optical transceiver A2 first transmits a channel setting optical signal SA1 for the channel CH1 in which the local channel information LA is the channel CH1 and the remote channel information RA is empty (NONE). In this example, the channel CH1 is a channel to be used for transmission from the optical transceiver A1 to the optical transceiver B1. That is, the reception port of the optical transceiver B1 is connected to the port of the channel CH1 in the optical multiplexer/demultiplexer M2 of the optical transmission apparatus 2. Therefore, the channel setting optical signal SA1 is blocked by the optical multiplexer/demultiplexer M2 and does not reach the optical transceiver B2.

(2) SB1/LB: CH1 and RB: None

Next, similarly to the example of FIG. 8, the optical transceiver B2 transmits the channel setting optical signal SB1 for the channel CH1 in which the local channel information LB is the channel CH1 and the remote channel information RB is empty (NONE). Since the transmission port of the optical transceiver A1 is connected to the port of the channel CH1 in the optical multiplexer/demultiplexer M1 of the optical transmission apparatus 1, the channel setting optical signal SB1 is blocked by the optical multiplexer/demultiplexer M1 and does not reach the optical transceiver A2.

(3) INS_M Input

Here, the user gives the instruction signal INS_M to the optical transceiver A2 in order to allocate the channel CH3 as the transmission channel of the optical transceiver A2 and allocate the channel CH4 as the transmission channel of the optical transceiver B2. When the instruction signal INS_M is received, the optical transceiver A2 stops the autonomous channel setting, that is, channel sweeping.

(4) SA0/LA: CH3, RA: CH4, and State Transition: EU→EK

In response to the instruction signal INS_M, the optical transceiver A2 transmits the channel setting optical signal SA0 for the channel CH3 in which the local channel information LA is fixed to the channel CH3 and the remote channel information RA is fixed to the channel CH4. The channel setting optical signal SA0 for the channel CH3 is received by the optical transceiver B2. At this time, since the optical transceiver A2 is in a state in which the channels to be used for transmission and reception are detected, the state of the optical transceiver A2 transitions from EU to EK.

Similarly to the case of FIG. 8, the optical transceiver B2 receives the channel CH3 as the local channel information LA and the channel CH4 as the remote channel information RA of the optical transceiver A2. The local channel information LA and the remote channel information RA of the optical transceiver A2 are respectively the remote channel information RB and the local channel information LB for the optical transceiver B2. Therefore, the optical transceiver B2 fixes the local channel information LB to the channel CH4 and fixes the remote channel information RB to the channel CH3. Note that the transmission channel of the optical transceiver B2 is set by fixing the local channel information LB and the remote channel information RB, and thus, the optical transceiver B2 stops the channel sweeping. As a result, the optical transceiver B2 is in a state (state EK) in which the transmission channel of the optical transceiver A2 as the partner and a channel through which transmission from the optical transceiver B2 to the optical transceiver A2 is possible are detected, and thus, the state transitions from EU to EK.

(5) SB0/LB: CH4, RB: CH3, and State Transition: EK→LE

The optical transceiver B2 transmits a channel setting optical signal SB0 for the channel CH4 in which the local channel information LB is fixed to the channel CH4 and the remote channel information RB is fixed to the channel CH3. The channel setting optical signal SB0 for the channel CH4 is received by the optical transceiver A2.

Similarly to the case of FIG. 8, the optical transceivers A2 and B2 can confirm that the local channel information LA of the optical transceiver A2 and the remote channel information RB of the optical transceiver B2 coincide as the channel CH3, and the local channel information LB of the optical transceiver B2 and the remote channel information RA of the optical transceiver A2 coincide as the channel CH4. Therefore, assuming that the channel to be used for transmission and the channel to be used for reception are determined, the optical transceivers A2 and B2 transition to a state (state LE: Link Established) in which connection is established, and end the channel setting processing.

As a result, after the manual channel setting is completed, the optical transceiver A2 and the optical transceiver B2 can transmit and receive optical signals using the channels CH3 and CH4 as in the first example embodiment.

As described above, according to the present configuration, even after autonomous channel setting is started, an optical transceiver can stop the autonomous channel setting by receiving the instruction signal INS_M and set a transmission channel and a reception channel designated by the instruction signal INS_M. In addition, an optical transceiver, which is a communication partner of the optical transceiver having received the instruction signal, can also set a transmission channel and a reception channel by receiving a channel setting optical signal from the optical transceiver having received the instruction signal INS_M.

When viewed from a user of a system in which an optical transceiver is mounted, it is possible to manually and easily perform channel setting of two optical transceivers only by giving an instruction signal for designating channels to be used for transmission and reception to one of the two optical transceivers that transmit and receive optical signals.

As a result, it is possible to preferentially and quickly complete a channel setting operation by performing interrupt processing of the instruction signal INS_M by software without requiring channel sweeping in the autonomous channel setting. In the example of FIG. 11, transmission and reception of the channel setting optical signals SA2 to SA4 and SB2 to SB4 accompanying the channel sweeping can be reduced as compared with the example of FIG. 8, and it can be understood that a time required for the channel setting can be shortened by a time required for the reduced transmission and reception of the channel setting optical signals.

Although the above description has focused on the optical transceivers A2 and B2, it goes without saying that manual channel setting processing can be similarly executed for the other optical transceivers A1, A3 to A25, B1, and B3 to B25.

Note that the example in which the instruction signal is given to manually perform the channel setting when the two optical transceivers that transmit and receive optical signals are both in the state EU in which a transmission channel and a reception channel that need to be set are unknown has been described in the above description, but this is merely an example. That is, there may be a case where, after autonomous channel setting is started, each of two optical transceivers that transmit and receive optical signals are in the state PK in which a transmission channel of an optical transceiver as a partner is detected or the state EK in which channel setting is not established although the transmission channel of the optical transceiver as the partner and a channel through which transmission to the optical transceiver as the partner is possible are detected as illustrated in FIG. 8. Even in this case, it is possible to give an instruction signal to one of the two optical transceivers that transmit and receive optical signals to stop the autonomous channel setting performed by the optical transceiver having received the instruction signal and to manually set channels to be used for transmission and reception. Further, the optical transceiver that is a communication partner of the optical transceiver having received the instruction signal can also manually set channels to be used for transmission and reception by receiving a channel setting optical signal (that is, the channel setting optical signal SA0 or SB0 in FIGS. 8 and 11) from the optical transceiver having received the instruction signal.

Third Example Embodiment

Although the channel setting in two optical transceivers that transmit and receive optical signals has been described in the first and second example embodiments, not only the above-described channel setting signal but also a control signal for an optical transceiver as a communication partner and a host apparatus to which the optical transceiver as the communication partner is connected can be superimposed as a signal to be superimposed on a main signal that is a data signal to be transmitted and received. In the present example embodiment, an optical transceiver capable of superimposing the control signal on the main signal will be described.

Figure 12:
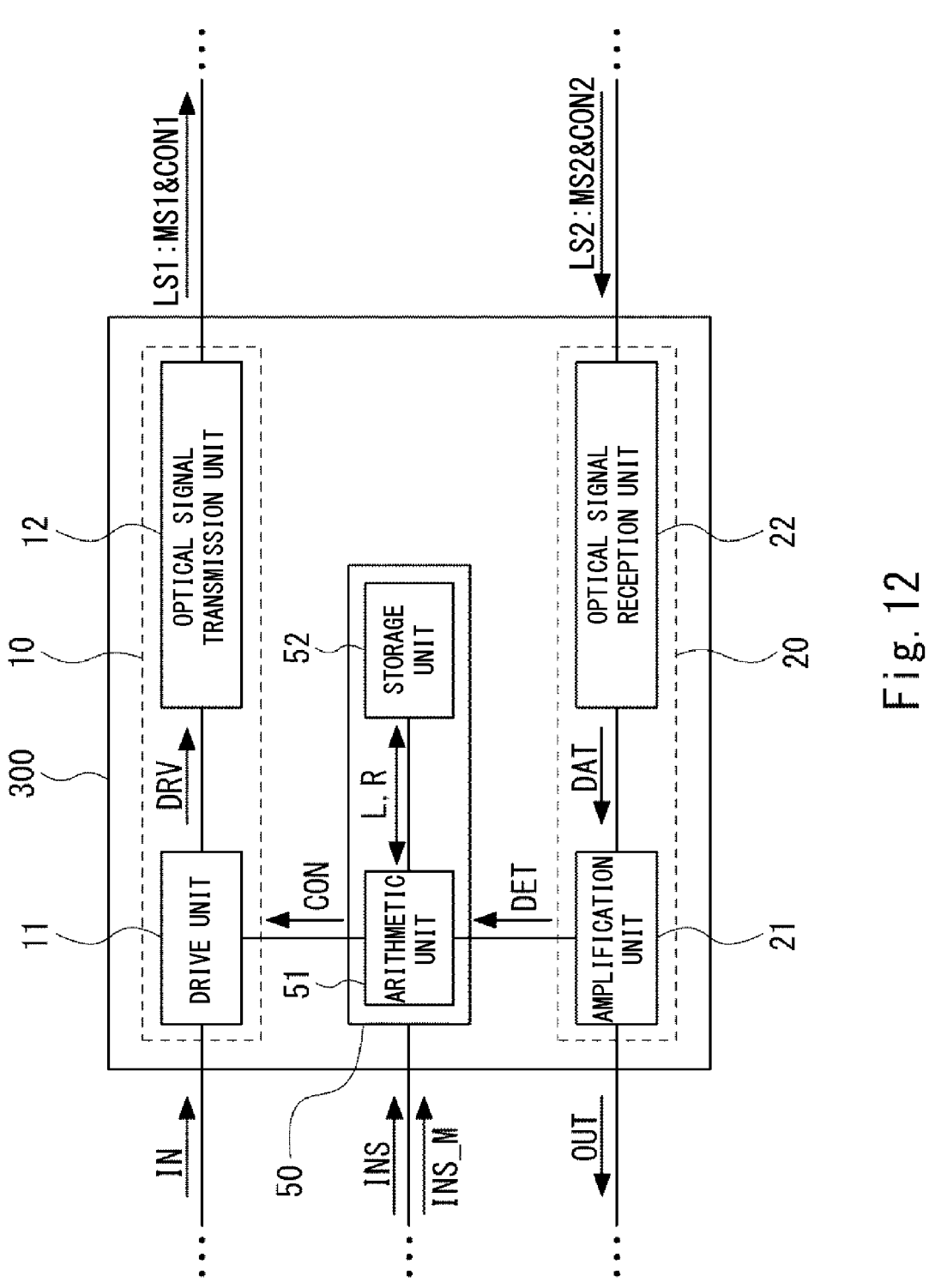
FIG. 12 is a diagram schematically illustrating a configuration of an optical transceiver according to a third example embodiment.

FIG. 12 schematically illustrates a configuration of an optical transceiver 300 according to a third example embodiment. The optical transceiver 300 according to the present example embodiment has a configuration in which the control unit 30 of the optical transceiver 100 is replaced with a control unit 50. An arithmetic unit 51 and a storage unit 52 of the control unit 50 correspond to the arithmetic unit 31 and the storage unit 32 of the control unit 30, respectively.

The optical transceiver 300 superimposes a control signal CON1 for controlling an operation of an optical transceiver as a communication partner or a host apparatus to which the optical transceiver as the communication partner is connected on the main signal MS1 and outputs the optical signal LS1. Further, the optical transceiver 300 is configured to be able to receive the optical signal LS2, which is output from the optical transceiver as the communication partner and obtained by superimposing a control signal CON2 on the main signal MS2, and to operate according to the control signal CON2. Note that transmission and reception of the control signals are similar to transmission and reception of the channel setting optical signals, and thus, description thereof will be omitted.

Figure 13:
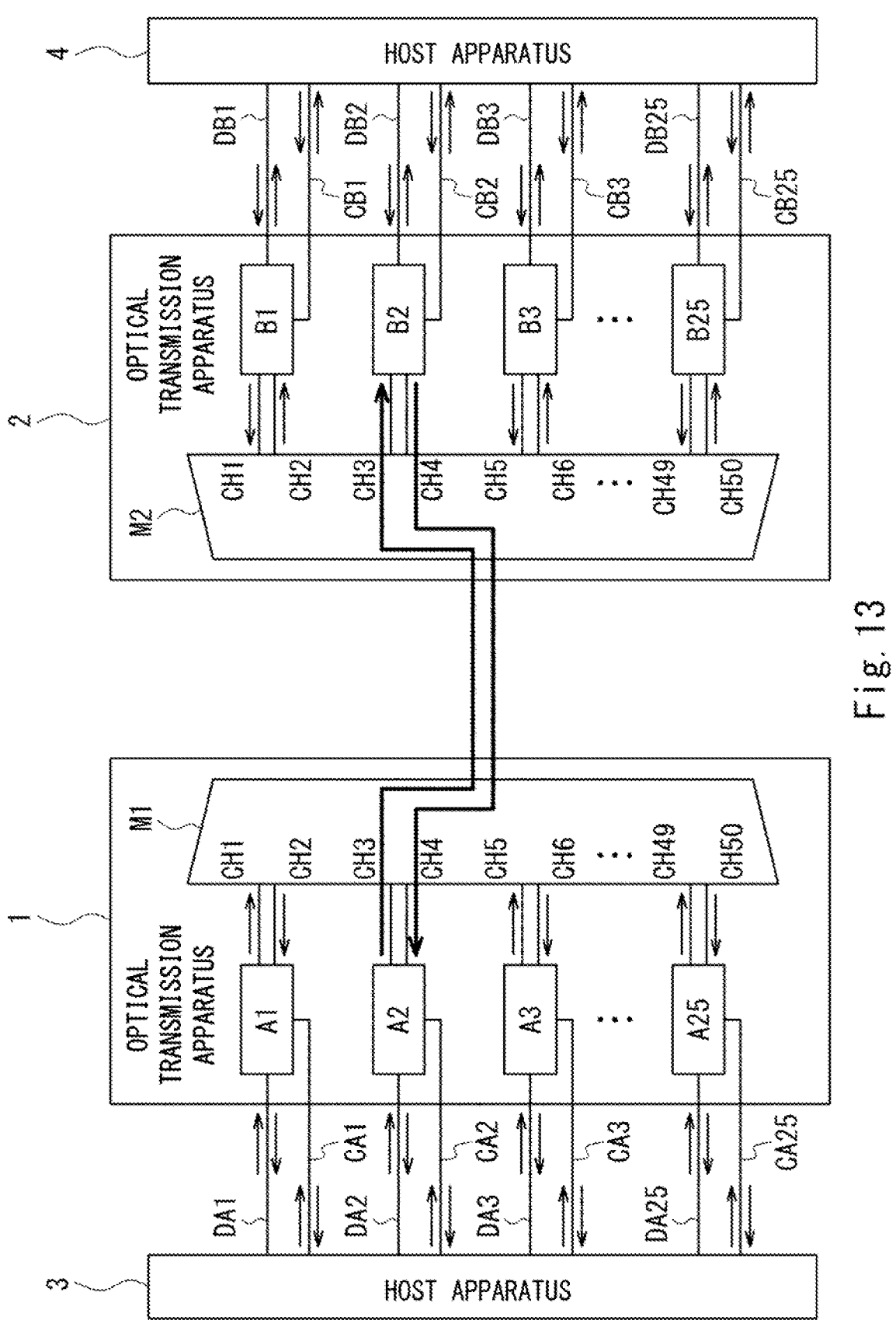
FIG. 13 is a diagram schematically illustrating a configuration of an optical communication system according to the third example embodiment and an example of transmission and reception of optical signals.

Next, transmission of a control signal and an operation corresponding thereto in the present example embodiment will be described. FIG. 13 schematically illustrates a configuration of an optical communication system according to the third example embodiment and an example of transmission and reception of optical signals. Similarly to the first and second example embodiments, it is assumed that the optical transmission apparatus 1 is provided with the optical transceivers A1 to A25 each having the same configuration as the optical transceiver 300, and the optical transmission apparatus 2 is provided with the optical transceivers B1 to B25 each having the same configuration as the optical transceiver 300.

The optical transceivers A1 to A25 installed in the optical transmission apparatus 1 are connected to a host apparatus 3 that performs communication with a partner through the optical transceivers A1 to A25 and performs various types of processing necessary for the communication. Each of the optical transceivers A1 to A25 and the host apparatus 3 are connected by each of data communication lines DA1 to DA25 for exchanging a data signals modulated into a main signal and transmitted by each transceiver and a data signal demodulated from a received main signal, and are connected by each of communication lines CA1 to CA25 for exchanging electrical signals other than the data signal.

The optical transceivers B1 to B25 installed in the optical transmission apparatus 2 are connected to a host apparatus 4 that performs communication with a partner through the optical transceivers B1 to B25 and performs various types of processing necessary for the communication. The optical transceivers B1 to B25 and the host apparatus 4 may be connected by data communication lines DB1 to DB25 for exchanging a data signal modulated into a main signal and transmitted by each transceiver and a data signal demodulated from a received main signal, and may be connected by communication lines CB1 to CB25 for exchanging electrical signals other than the data signal.

For simplification of description, an example in which a control signal CS superimposed on a main signal is transmitted from the optical transceiver A2 to the optical transceiver B2 will be described.

Figure 14:
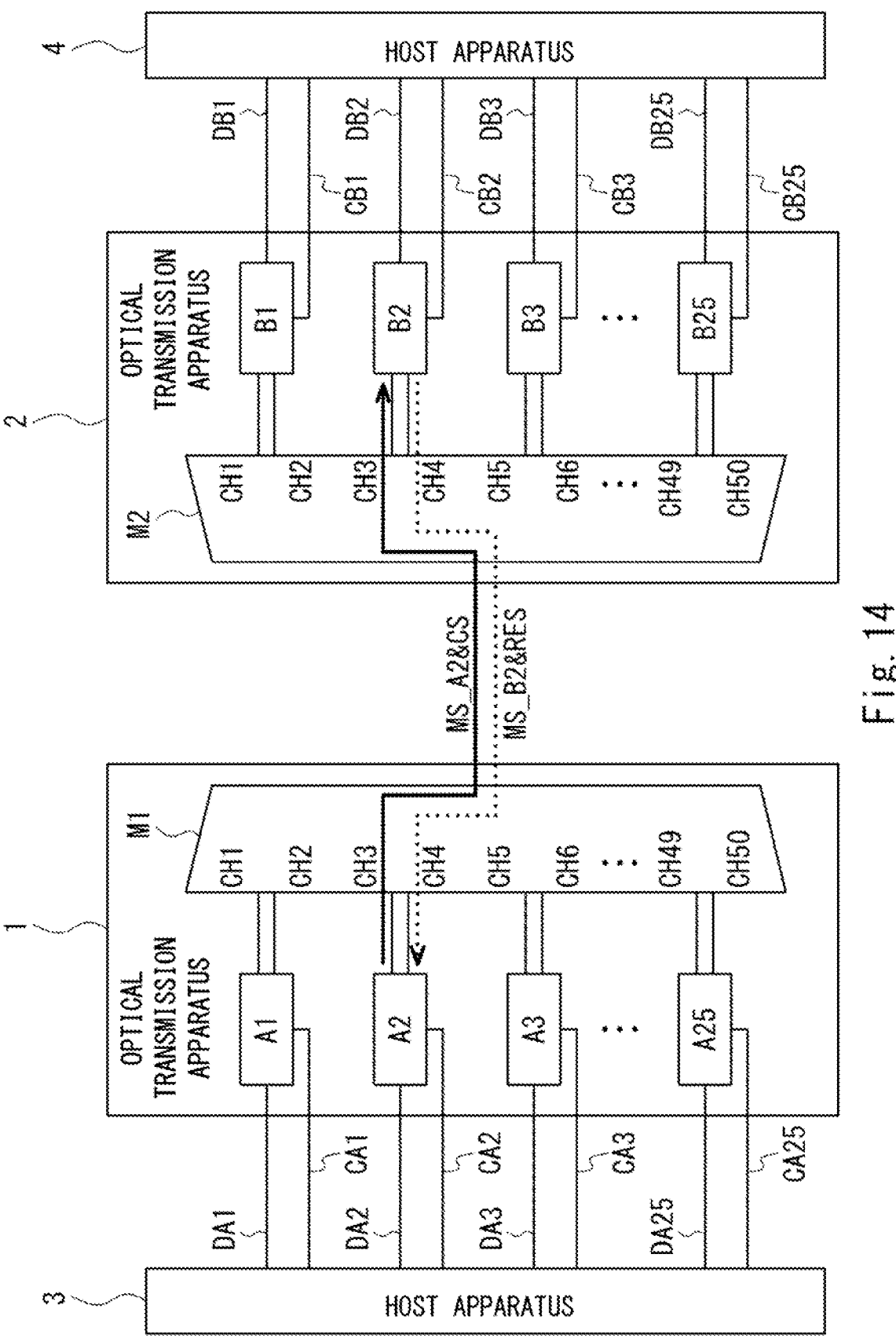
FIG. 14 is a diagram schematically illustrating a signal flow in a case where an optical transceiver as a communication partner is controlled in the third example embodiment.

First, a case where an optical transceiver as a communication partner is controlled will be described. FIG. 14 schematically illustrates a signal flow in a case where the optical transceiver as the communication partner is controlled in the third example embodiment. The optical transceiver A2 as a transmission source can instruct the optical transceiver B2 as a communication partner to turn on and off optical output, that is, to start and stop transmission of an optical signal by transmitting the control signal CS superimposed on a main signal MS_A2. Note that the optical transceivers can output control signals in response to provision of signals such as the instruction signal INS and the instruction signal INS_M.

Further, the optical transceiver A2 can make a request for information such as a setting parameter of the optical transceiver B2 as the communication partner by transmitting the control signal CS superimposed on the main signal MS_A2. The optical transceiver B2 having received the request transmits a response signal RES indicating the held information and being superimposed on a main signal MS_B2 to the optical transceiver A2. The optical transceiver A2 receives the response signal RES, converts the response signal RES into a response signal RES_E that is an electrical signal, and forwards the response signal RES_E to the optical transmission apparatus 1 and other apparatuses as necessary. The information to be requested is, for example, setting information such as a transmission channel, a reception channel, optical output, an optical input level, a transceiver temperature, laser state monitoring (a wavelength monitor, a laser temperature, and a laser current value), an optical transceiver product name, and a version of a program main body.

Figure 15:
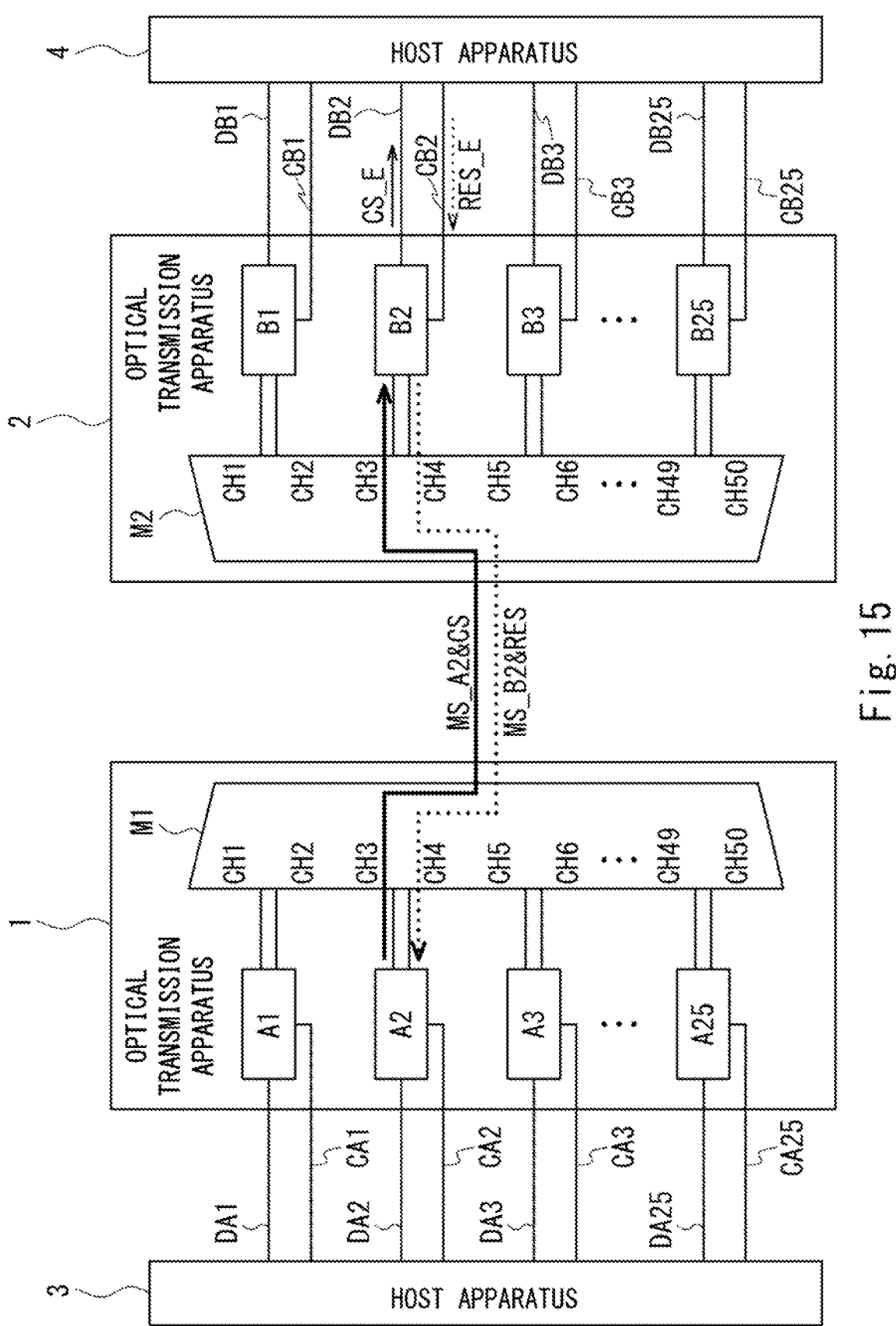
FIG. 15 is a diagram schematically illustrating a signal flow in a case where a host apparatus to which the optical transceiver as the communication partner is connected is controlled in the third example embodiment.

Next, a case where a host apparatus of the communication partner is controlled will be described. FIG. 15 schematically illustrates a signal flow in the case where the host apparatus to which the optical transceiver as the communication partner is connected is controlled in the third example embodiment. The optical transceiver A2 can also give an instruction for on and off of communication processing in the host apparatus 4 to which the optical transceiver B2 as the communication partner is connected by transmitting the control signal CS. In this case, the optical transceiver A2 transmits the control signal CS to the optical transceiver B2, and the optical transceiver B2 receives the control signal CS, converts the control signal CS into a control signal CS_E that is an electrical signal, and forwards the control signal CS_E to the optical transmission apparatus 2 through the communication line CB2. The host apparatus 4 can stop and start the communication processing according to the control signal CS_E.

Further, the optical transceiver A2 can request information held by the host apparatus 4 to which the optical transceiver B2 as the communication partner is connected by transmitting the control signal CS. In this case, the host apparatus 4 outputs the response signal RES_E, which is an electrical signal indicating the information requested by the control signal CS_E, to the optical transceiver B2 through the communication line CB2. The optical transceiver B2 superimposes the response signal RES_E on the main signal MS_B2 as an optical signal RES and transmits the optical signal RES to the optical transceiver A2. The optical transceiver A2 receives the response signal RES, converts the response signal RES into the response signal RES_E that is an electrical signal, and forwards the response signal RES_E to the host apparatus 3 through the communication line CA2 or to other apparatuses as necessary. The requested information is, for example, setting information such as the number of connected optical transceivers and transmission and reception channels of the respective optical transceivers.

As described above, according to the present configuration, a control signal superimposed on a main signal is transmitted from one of two optical transceivers that transmit and receive optical signals to the other optical transceiver as a communication partner, thereby enabling control of operations of the optical transceiver as the communication partner and a host apparatus to which the optical transceiver as the communication partner is connected.

The optical communication system illustrated in FIG. 13 described in the present example embodiment is used in, for example, a 5th generation mobile communication system (hereinafter, referred to as 5G). In such a system, it is known that a base station provided with an optical transmission apparatus is often installed in a place where it is relatively difficult to approach, such as a mountain, a rooftop of a building, or a region where a railroad is laid. In this case, it is difficult for workers to reach the base station in the first place, and a worker with special skills is required. On the other hand, according to the present configuration, a control signal can be transmitted from an optical transceiver in a remote base station to a target optical transceiver to remotely control operations, and thus, it is possible to cause the target optical transceiver or the optical transmission apparatus to perform a desired operation without dispatching a worker to the base station. Therefore, personnel, cost, and time required for maintenance and inspection work of the optical transceiver, the optical transmission apparatus, and the like can be greatly reduced.

Further, it is known that the number of installed base stations is relatively large in the 5G because the frequency used for communication is short as compared with previous mobile communication systems. Therefore, it is possible to cause the optical transmission apparatus and the optical transceiver in the base station to perform a desired operation by performing remote control as in the present configuration even if many base stations are installed. As a result, it is possible to effectively suppress an increase in personnel, cost, and time required for the maintenance and inspection work caused by an increase in the number of base stations.

Other Example Embodiments

Note that the present invention is not limited to the above example embodiments, and can be appropriately changed without departing from the gist. For example, the optical transmission apparatuses may be connected to not only the network illustrated in FIG. 1 but also various networks including a trunk path and branch paths.

The number of optical transceivers and the number of channels provided in the optical transmission apparatuses are merely examples, and any number of optical transceivers and any number of channels may be provided.

The description has been given assuming that a wavelength-multiplexed signal is transmitted between the optical transmission apparatuses in the above example embodiments. However, it goes without saying that various multiplexing schemes other than wavelength multiplexing and various modulation systems can be applied to an optical signal to be transmitted.

The above-described optical transceivers have the configuration simplified to describe the optical transceivers according to the above-described example embodiments, and it goes without saying that various components such as a clock data recovery (CDR) unit may be included.

Although an example in which an optical signal subjected to on/off modulation is used as the channel setting optical signal has been described in the above description, an optical signal subjected to phase shift modulation other than the on/off modulation may be used as the channel setting optical signal.

Although the present invention has been mainly described as a hardware configuration in the above-described example embodiments, the present invention is not limited thereto, and the control of the wavelength-tunable optical transmission unit and the wavelength-tunable optical reception unit by the control unit and the channel setting processing can also be achieved by causing a central processing unit (CPU) to execute a computer program. In this case, the arithmetic unit included in the control unit may be configured as the CPU. The program includes an instruction (or software code) that, when read by a computer, causes a computer to execute one or more functions described in the above example embodiments. The program may be stored in a non-transitory computer-readable medium or a tangible storage medium. Examples of the non-transitory computer-readable medium or the tangible storage medium include, but are not limited to, a random-access memory (RAM), a read-only memory (ROM), a flash memory, a solid-state drive (SSD), or other types of storage technologies, for example, a compact disc (CD)-ROM, a digital versatile disc (DVD), a Blu-ray disc, or other types of optical disk storage devices, and a magnetic cassette, a magnetic tape, magnetic disk storage, or other magnetic storage devices. The program may be transmitted using a transitory computer-readable medium or a communication medium. Examples of the transitory computer-readable medium or the tangible storage medium may include, but are not limited to, electrical, optical, acoustic, or other forms of propagation signals.

As the storage unit provided in the control unit, various storage devices capable of writing and reading information, such as a RAM, a flash memory, an SSD, an optical disk storage device, a magnetic cassette, a magnetic tape, and magnetic disk storage, can be used.

Although the invention of the present application has been described above with reference to the example embodiments, the invention of the present application is not limited to the above. Various modifications that can be understood by those skilled in the art can be made to the configuration and details of the invention of the present application within the scope of the invention.

REFERENCE SIGNS LIST

1, 2 OPTICAL TRANSMISSION APPARATUS
3, 4 HOST APPARATUS
10 WAVELENGTH-TUNABLE OPTICAL TRANSMISSION UNIT
11 DRIVE UNIT
12 OPTICAL SIGNAL TRANSMISSION UNIT
20 WAVELENGTH-TUNABLE OPTICAL RECEPTION UNIT
21 AMPLIFICATION UNIT
22 OPTICAL SIGNAL RECEPTION UNIT
30, 40, 50 CONTROL UNIT
31, 41, 51 ARITHMETIC UNIT
32, 42, 52 STORAGE UNIT
100, A1 to A25, B1 to B25 OPTICAL TRANSCEIVER
1000 OPTICAL COMMUNICATION SYSTEM
AMP OPTICAL AMPLIFIER
BS1, BS2 TERMINAL STATION
C1, C2 OPTICAL CABLE
CA1 to CA25, CB1 to CB25 DATA COMMUNICATION LINE
CS, CS_E CONTROL SIGNAL

23

CON CONTROL SIGNAL
DAT OUTPUT SIGNAL
DET DETECTION SIGNAL
DRV DRIVE SIGNAL
DA1 to DA25, DB1 to DB25 DATA COMMUNICA-
TION LINE
IN MAIN SIGNAL
INS, INS_M INSTRUCTION SIGNAL
L, LA, LB LOCAL CHANNEL INFORMATION
LS1, LS2 OPTICAL SIGNAL
M1, M2 OPTICAL MULTIPLEXER/DEMULTI-
PLEXER
MS, MS1, MS2, MS_A2, MS_B2 MAIN SIGNAL
OH HEADER INFORMATION
OUT OUTPUT SIGNAL
R, RA, RB REMOTE CHANNEL INFORMATION
RES, RES_E RESPONSE SIGNAL
S, S1, S2, SA, SA0 to SA4, SB, SB0 to SB4 CHANNEL
SETTING OPTICAL SIGNAL

What is claimed is:

1. An optical transceiver comprising:
a wavelength-tunable optical transmission unit configured
to be capable of transmitting a first channel setting
optical signal superimposed on a first main signal
obtained by modulating data to be transmitted, the first
channel setting optical signal including first channel
information indicating a channel of the first channel
setting optical signal;
a wavelength-tunable optical reception unit configured to
forward second channel information included in a
second channel setting optical signal when the second
channel setting optical signal superimposed on a sec-
ond main signal obtained by modulating data to be
received is received from another optical transceiver,
the second channel information indicating a channel of
the second channel setting optical signal; and
a control unit configured to control the wavelength-
tunable optical transmission unit and the wavelength-
tunable optical reception unit,
wherein the control unit
causes the wavelength-tunable optical transmission unit
to repeatedly transmit the first channel setting optical
signal while changing a transmission channel of the
first channel setting optical signal until the wavelength-
tunable optical reception unit receives the second chan-
nel setting optical signal when a first instruction signal
is received,
sets a channel indicated by the second channel informa-
tion as a channel of an optical signal to be received by
the wavelength-tunable optical reception unit when the
wavelength-tunable optical reception unit receives the
second channel setting optical signal, and
sets a channel of an optical signal to be transmitted by the
wavelength-tunable optical transmission unit to a first
designated channel and sets a channel of an optical
signal to be received by the wavelength-tunable optical
reception unit to a second designated channel when a
second instruction signal designating the first desig-
nated channel of the optical signal to be transmitted by
the wavelength-tunable optical transmission unit and
the second designated channel of the optical signal to
be received by the wavelength-tunable optical recep-
tion unit are received after the first instruction signal is
received.

24

2. The optical transceiver according to claim 1, wherein
the wavelength-tunable optical transmission unit is
capable of transmitting a control signal superimposed
on the first main signal to another optical transceiver,
and
the control unit causes the wavelength-tunable optical
transmission unit to transmit the control signal to
control an operation of the another optical transceiver.

3. The optical transceiver according to claim 2, wherein
the control unit controls on and off of optical output of the
another optical transceiver by the control signal.

4. The optical transceiver according to claim 2, wherein
the control unit requests information held in the another
optical transceiver by the control signal, and
the another optical transceiver outputs a signal that indi-
cates the requested information and is superimposed on
the second main signal.

5. The optical transceiver according to claim 2, wherein
the control unit controls on and off of an apparatus to which
the another optical transceiver is connected by the control
signal.

6. The optical transceiver according to claim 2, wherein
the control unit requests information held in an apparatus
to which the another optical transceiver is connected by
the control signal,
the another optical transceiver forwards the received
request to the apparatus,
the apparatus outputs a signal indicating the requested
information to the another optical transceiver in
response to the forwarded request, and
the another optical transceiver superimposes a signal
based on the signal received from the apparatus on the
second main signal and outputs the signal superim-
posed on the second main signal.

7. An optical communication system comprising:
two optical transmission apparatuses facing each other,
each of the optical transmission apparatuses including
a plurality of optical transceivers and a first optical
multiplexer/demultiplexer configured to multiplex
optical signals output from the plurality of optical
transceivers and output a multiplexed optical signal and
demultiplexes a received optical signal into the plural-
ity of optical transceivers according to a channel; and
an optical cable configured to connect the two optical
transmission apparatuses facing each other, wherein
a first optical transceiver that is the optical transceiver of
one of the optical transmission apparatuses includes:
a wavelength-tunable optical transmission unit configured
to be capable of transmitting a first channel setting
optical signal superimposed on a first main signal
obtained by modulating data to be transmitted, the first
channel setting optical signal including first channel
information indicating a channel of the first channel
setting optical signal;
a wavelength-tunable optical reception unit configured to
forward second channel information included in a
second channel setting optical signal when the second
channel setting optical signal superimposed on a sec-
ond main signal obtained by modulating data to be
received is received from a second optical transceiver
that is the optical transceiver of another of the optical
transmission apparatuses, the second channel informa-
tion indicating a channel of the second channel setting
optical signal; and
a control unit configured to control the wavelength-
tunable optical transmission unit and the wavelength-
tunable optical reception unit, and the control unit causes the wavelength-tunable optical transmission unit to repeatedly transmit the first channel setting optical signal while changing a transmission channel of the first channel setting optical signal until the wavelength-tunable optical reception unit receives the second channel setting optical signal when a first instruction signal is received, sets a channel indicated by the second channel information as a channel of an optical signal to be received by the wavelength-tunable optical reception unit when the wavelength-tunable optical reception unit receives the second channel setting optical signal, and sets a channel of an optical signal to be transmitted by the wavelength-tunable optical transmission unit to a first designated channel and sets a channel of an optical signal to be received by the wavelength-tunable optical reception unit to a second designated channel when a second instruction signal designating the first designated channel of the optical signal to be transmitted by the wavelength-tunable optical transmission unit and the second designated channel of the optical signal to be received by the wavelength-tunable optical reception unit are received after the first instruction signal is received.

8. A method for setting an optical transceiver, the optical transceiver including: a wavelength-tunable optical transmission unit configured to be capable of transmitting a first channel setting optical signal superimposed on a first main signal obtained by modulating data to be transmitted, the first channel setting optical signal including first channel information indicating a channel of the first channel setting optical signal; a wavelength-tunable optical reception unit configured to forward second channel information included in a second channel setting optical signal when the second channel setting optical signal superimposed on a second main signal obtained by modulating data to be received is received from another optical transceiver, the second channel information indicating a channel of the second channel setting optical signal; and a control unit configured to control the wavelength-tunable optical transmission unit and the wavelength-tunable optical reception unit, the method comprising:

causing the wavelength-tunable optical transmission unit to repeatedly transmit the first channel setting optical signal while changing a transmission channel of the first channel setting optical signal until the wavelength-tunable optical reception unit receives the second channel setting optical signal when a first instruction signal is received;

setting a channel indicated by the second channel information as a channel of an optical signal to be received by the wavelength-tunable optical reception unit when the wavelength-tunable optical reception unit receives the second channel setting optical signal; and setting a channel of an optical signal to be transmitted by the wavelength-tunable optical transmission unit to a first designated channel and setting a channel of an optical signal to be received by the wavelength-tunable optical reception unit to a second designated channel when a second instruction signal designating the first designated channel of the optical signal to be transmitted by the wavelength-tunable optical transmission unit and the second designated channel of the optical signal to be received by the wavelength-tunable optical reception unit are received after the first instruction signal is received.

* * * * *